US012514771B2

(12) United States Patent
Klein

(10) Patent No.: US 12,514,771 B2
(45) Date of Patent: Jan. 6, 2026

(54) PRONE ARTICULATED HEADREST

(71) Applicant: Jonathan W Klein, Hudson, OH (US)

(72) Inventor: Jonathan W Klein, Hudson, OH (US)

(73) Assignee: Assured Innovations LLC, Hudson, OH (US)

( * ) Notice: Subject to any disclaimer, the term of this patent is extended or adjusted under 35 U.S.C. 154(b) by 320 days.

(21) Appl. No.: 18/205,298

(22) Filed: Jun. 2, 2023

(65) Prior Publication Data

US 2023/0390136 A1 Dec. 7, 2023

Related U.S. Application Data

(60) Provisional application No. 63/348,517, filed on Jun. 3, 2022.

(51) Int. Cl.
*A61G 13/12* (2006.01)

(52) U.S. Cl.
CPC .................................. *A61G 13/121* (2013.01)

(58) Field of Classification Search
CPC .. A61G 13/0054; A61G 13/009; A61G 13/10; A61G 13/1205; A61G 13/121; A61G 13/1215; A61G 13/122; A61G 13/1225; A61G 13/123; A61G 13/1235; A61G 13/124; A61G 13/1245; A61G 13/125; A61G 13/1255; A61G 13/126; A61G 13/128; A61G 2200/325; A61B 6/0421
See application file for complete search history.

(56) References Cited

U.S. PATENT DOCUMENTS

| | | | | | |
|---|---|---|---|---|---|
| 2,532,967 | A * | 12/1950 | Thompson | A61B 5/103 | 378/205 |
| 3,675,646 | A * | 7/1972 | Corcoran | A61G 15/007 | D24/188 |
| 4,354,485 | A * | 10/1982 | Safadago | A61G 13/009 | 606/242 |
| 4,465,069 | A * | 8/1984 | Barbier | A61B 90/11 | 600/436 |
| 4,545,572 | A * | 10/1985 | Day | A61B 90/14 | 5/637 |
| 4,823,776 | A * | 4/1989 | Foster | A61G 7/072 | 5/643 |
| 6,594,839 | B1 * | 7/2003 | Papay | A61G 13/12 | 5/640 |
| 8,893,333 | B2 * | 11/2014 | Soto | A61G 13/101 | 5/636 |
| 9,168,009 | B2 * | 10/2015 | Lee | A61B 6/0442 | |
| 2006/0253985 | A1 * | 11/2006 | Skripps | A61G 13/129 | 5/622 |
| 2006/0290195 | A1 * | 12/2006 | Roleder | A61G 7/072 | 297/397 |
| 2008/0271248 | A1 * | 11/2008 | DeLaura | A61G 13/0054 | 5/638 |
| 2009/0307845 | A1 * | 12/2009 | Rao | A61G 13/0072 | 5/624 |
| 2017/0273481 | A1 * | 9/2017 | Du | A61G 13/121 | |
| 2022/0087888 | A1 * | 3/2022 | Lewold | A61G 13/124 | |

* cited by examiner

*Primary Examiner* — George Sun
(74) *Attorney, Agent, or Firm* — Lippes Mathias LLP

(57) ABSTRACT

A headrest assembly includes a frame and a plurality of support pads. The plurality of support pads may include a forehead pad, a chin pad, and two zygomatic arch pads. One or more of the plurality of support pads may be adjustable vertically and horizontally relative to the frame through adjustment arms.

10 Claims, 24 Drawing Sheets

PRONE ARTICULATED HEADREST

The present application claims priority to U.S. Provisional Patent Application Ser. No. 63/348,517, filed Jun. 3, 2022, which is incorporated by reference herein in its entirety.

BACKGROUND

During surgical procedures, there is a variety of patient positions depending on the nature of the performed procedure. Most positions aim to allow optimal surgical exposure of the patient's surgical site. One such position is the prone position, during which the patient lies facedown. When in the prone position, it is desirable that the patient's eyes, ears, nose, and mouth are free of pressure and the cervical spine is neutral. Potential complications from improper padding of the patient's face can include necrosis of the lips, nostrils, nasal passages, or skin. Ocular complications may also occur. To ensure protection of these areas and the patient's comfort during the procedure, a variety of prone positioning headrests are used. However, the manufacturers of most of the existing headrests do not consider the fact that patients' faces are not uniform, and most headrests are "one-size-fits-all". To adequately pad each patient's face, multiple alterations or manipulations of the current headrests must be performed. As a result, the altered headrest no longer resembles the original device and often must be discarded after the alterations. Even after these extensive alterations have been made, the medical professionals have to continuously monitor the patient's face for any possible movement of the padding device that may encroach on any of the patient's sensitive areas.

In addition, most existing headrests are not adjustable. It is desirable to provide a secure and functional headrest positioning device that would increase patients' safety and well-being, while allowing continued use of the headrest and adjustability for different patients.

BRIEF DESCRIPTION

This Brief Description is provided to introduce a selection of concepts in a simplified form that are further described below in the Detailed Description. This Brief Description is not intended to identify key factors or essential features of the claimed subject matter, nor is it intended to be used to limit the scope of the claimed subject matter.

One or more techniques and/or systems described herein can be used to provide a secure and functional headrest positioning device that would increase patients' safety and well-being. In one implementation, a headrest assembly may comprise a frame and a plurality of separate pads operably connected to the frame. Each of the plurality pads may be independently and selectably adjusted.

Disclosed, in some embodiments, is an adjustable headrest assembly including: a frame; and a plurality of support pads operably connected to the frame configured to contact portions of a patient's face. At least one of the plurality of support pads is selectably adjustable horizontally and vertically relative to the frame for a patient disposed in prone position.

Disclosed, in other embodiments, is a headrest assembly including: a frame; a forehead pad; a chin pad; and two zygomatic arch pads. Each of the forehead pad, the chin pad, and the two zygomatic arch pads is attached to the frame and may be configured to be adjusted.

Each of the forehead pad, the chin pad, and the two zygomatic arch pads may be independently adjustable from the other pads.

In some embodiments, each of the forehead pad, the chin pad, and the two zygomatic arch pads is vertically adjustable relative to the frame.

The forehead pad may be mounted to a top portion of the frame and may be horizontally adjustable relative to the top portion of the frame.

In some embodiments, each of the two zygomatic arch pads is mounted to a side portion of the frame and each of the two zygomatic arch pads is horizontally adjustable relative to the side portions of the frame.

The frame may include a top portion and a bottom portion, both perpendicular to an X-axis, and two side portions, each perpendicular to a Y-axis, and wherein each of the two zygomatic arch pads may be configured to be rotated at an angle horizontally or vertically relative to the X-axis or the Y-axis, respectively.

Disclosed, in further embodiments, is a headrest assembly including: a frame; a forehead pad assembly operably connected to the frame, a chin pad assembly operably connected to the frame, and two zygomatic arch pads operably connected to the frame. The forehead pad assembly includes: a forehead pad; and a forehead pad actuator configured to actuate movement of the forehead pad towards or away from the chin pad. The chin pad assembly includes: a chin pad; and a chin pad actuator configured to actuate movement of the chin pad towards or away from the forehead pad. Each zygomatic arch pad includes: a zygomatic arch pad; and a zygomatic pad actuator configured to actuate movement of the zygomatic arch pad towards or away from the other zygomatic arch pad.

The headrest assembly may further include a mirror releasably attached to the frame.

In some embodiments, the headrest assembly further includes a plurality of magnets for attaching the mirror to the frame.

The magnets may include a rare earth metal.

In some embodiments, the rare earth metal is neodymium.

The headrest assembly may further include four corner magnet mounts, each corner magnet mount associated with a different individual magnet of the plurality of magnets and comprising a mirror corner recess configured to receive a different corner of the mirror; and four corner brackets, each corner bracket associated with a different cornet magnet mount.

In some embodiments, the forehead pad assembly further includes: a forehead slide lock connecting the forehead pad to the forehead pad actuator; a chin slide lock connecting the chin pad to the chin pad actuator; and a zygomatic slide lock extending between the zygomatic arch pad to the zygomatic pad actuator.

Each zygomatic arch pad may further include: an articulating mast extending between the zygomatic slide lock and the zygomatic arch pad.

In some embodiments, the articulating mast is connected to the zygomatic arch pad via a ball joint.

The headrest assembly may further include a screw extending into the articulating mast to lock a vertical position of the zygomatic arch pad; and a clamping handle to lock the ball joint.

In some embodiments, the forehead slide lock includes a forehead slide housing attached to the frame via at least one fastener; the chin slide lock includes a chin slide housing attached to the frame via at least one fastener; and each zygomatic slide lock includes a zygomatic slide housing attached to the frame via at least one fastener.

The chin slide housing and the forehead slide housing may be attached to a top surface of the frame; and the zygomatic slide housing may be attached to an underside of the frame.

In some embodiments, the frame includes four legs; each leg being connected to a different leveling mount.

To the accomplishment of the foregoing and related ends, the following description and annexed drawings set forth certain illustrative aspects and implementations. These are indicative of but a few of the various ways in which one or more aspects may be employed. Other aspects, advantages and novel features of the disclosure will become apparent from the following detailed description when considered in conjunction with the annexed drawings.

BRIEF DESCRIPTION OF THE DRAWINGS

The following is a brief description of the drawings, which are presented for the purposes of illustrating the exemplary embodiments disclosed herein and not for the purposes of limiting the same.

What is disclosed herein may take physical form in certain parts and arrangement of parts, and will be described in detail in this specification and illustrated in the accompanying drawings which form a part hereof and wherein.

DETAILED DESCRIPTION

Figure 1A:
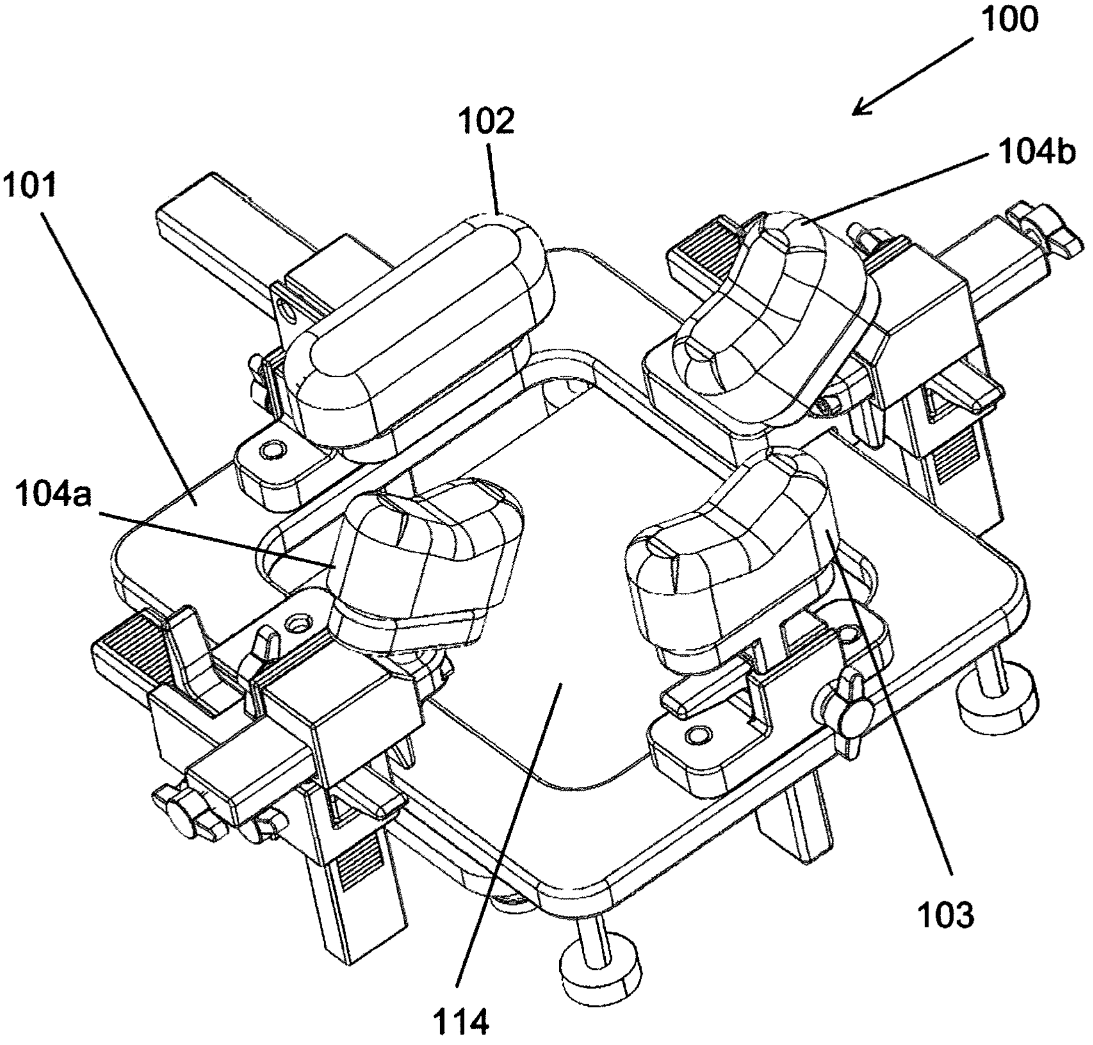
FIG. 1A is a component diagram illustrating an exemplary implementation of a prone articulating headrest assembly in a retracted position.

The present disclosure may be understood more readily by reference to the following detailed description of desired embodiments included therein. In the following specification and the claims which follow, reference will be made to a number of terms which shall be defined to have the following meanings.

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent can be used in practice or testing of the present disclosure. All publications, patent applications, patents, and other references mentioned herein are incorporated by reference in their entirety. The materials, methods, and articles disclosed herein are illustrative only and not intended to be limiting.

The singular forms "a," "an," and "the" include plural referents unless the context clearly dictates otherwise.

As used in the specification and in the claims, the term "comprising" may include the embodiments "consisting of" and "consisting essentially of." The terms "comprise(s)," "include(s)," "having," "has," "can," "contain(s)," and variants thereof, as used herein, are intended to be open-ended transitional phrases that require the presence of the named ingredients/steps and permit the presence of other ingredients/steps. However, such description should be construed as also describing compositions, mixtures, or processes as "consisting of" and "consisting essentially of" the enumerated ingredients/steps, which allows the presence of only the named ingredients/steps, along with any impurities that might result therefrom, and excludes other ingredients/steps.

The techniques and/or systems described herein can be used to provide an adjustable, secure, and functional padded face guard that is designed to increase patient safety and well-being during surgical procedures, in which the patient is in a prone position (i.e., lies face-down). As an example, a prone articulating headrest includes separate pads that are designed to independently support the patient's forehead, chin, and each zygomatic arch, while the patient is in the prone position. This configuration allows for the patient's eyes, ears, nose, and mouth to remain free of pressure during surgical procedures, thereby avoiding potential complications from improper padding of the patient's face. In addition, because each pad is independently adjustable, the prone articulating headrest assembly may be suitable for a variety of patients with different physical attributes, which would allow continued use of the headrest for multiple patients.

FIGS. 1-7 illustrate exemplary implementations of a prone articulating headrest assembly. With reference to FIG. 1A and FIG. 1B, an exemplary implementation of a prone articulating headrest 100 is disclosed with a plurality of support pads in a retracted position and an extended position, respectively. As shown in FIG. 1A, the prone articulating headrest 100 may comprise a frame 101 and the plurality of support pads. The plurality of support pads may comprise a forehead pad 102, a chin pad 103, and two zygomatic arch pads 104*a* and 104*b*. Each of the plurality of support pads may be independently and selectably moved to customize the placement and fit to the patient's face and head.

The forehead pad 102 may be configured to support the forehead of the patient. The chin pad 103 may be configured to support the chin of the patient. In some implementations, the chin pad 103 may not protrude below the patient's chin, to avoid undesirable pressure on the patient's neck or airways during the surgical procedure, for example. The two zygomatic arch pads 104*a* and 104*b* may be configured to support the patient's zygomatic bone, also called a cheekbone or a malar bone, which is situated at the upper and lateral part of the patient's face below and lateral to the eye socket or orbit, at the widest part of the cheek, and which forms the prominence of the cheek.

In addition, because the forehead pad 102, the chin pad 103, and the zygomatic arch pads 104*a* and 104*b* are separate pads (as opposed, for example, to one cushion that supports the entire face of the patient), ample space for tubes or other medical devices can be available between the forehead pad 102, the chin pad 103, and the zygomatic arch pads 104*a* and 104*b*. For example, due to their usual placement in or on the patient's nose or mouth, airway supply tubing or monitoring equipment may protrude in any space available between the frame 101 and the chin pad 103 and/or between the frame 101 and one or both of the zygomatic arch pads 104*a* and 104*b*.

Figure 2A:
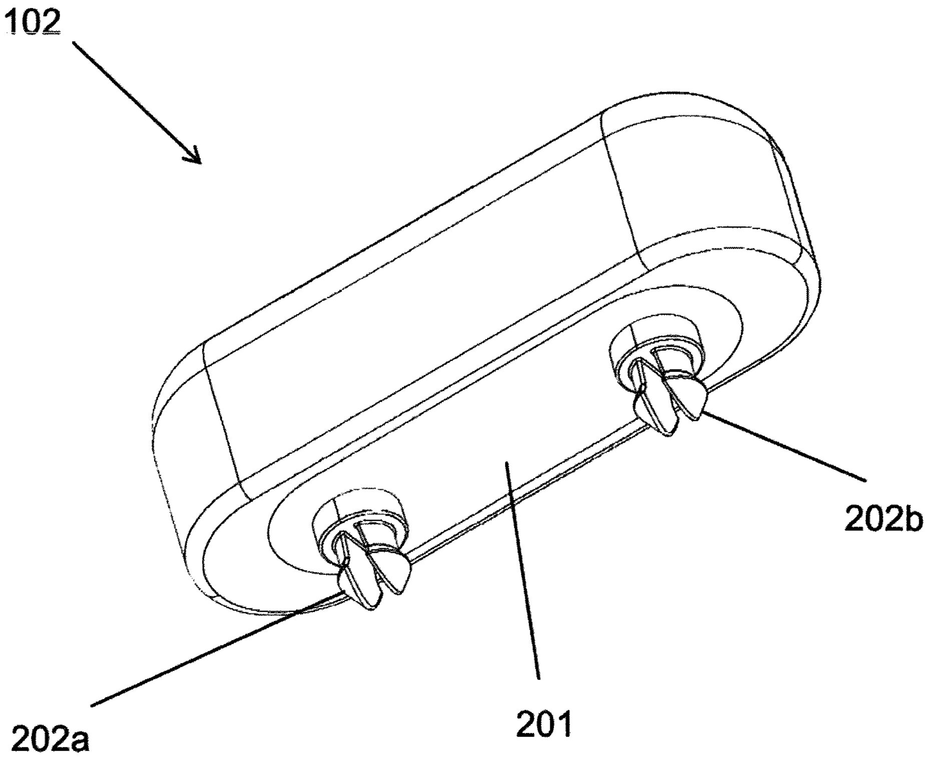
FIG. 2A illustrates a bottom perspective view of an exemplary implementation of the forehead pad of the prone articulating headrest of FIG. 1A and FIG. 1B.

Each of the pads 102, 103, 104*a*, and 104*b* can be made of a soft pliable material, such as a polyurethane foam or a foam rubber, a gel, a combination of gel and foam, or other soft resilient material, for example. For example, as illustrated in FIG. 2A, the forehead pad 102 can be foam-overmolded on a base 201 with snaps 202*a* and 202*b*. The chin pad 103 and the two zygomatic arch pads 104*a* and 104*b* can be constructed in a similar manner. This configuration can allow fast and easy replacement of the pads 102, 103, 104*a*, and 104*b*, if needed. The frame 101 can be provided in different sizes to cover a range of different sizes of patients' heads (child, small adult, large adult, etc.). For example, the frames sizes can cover a range of head circumferences starting from 9", and ranging through about 15.9", 17.7", to 24.5". A small overlap in size may be provided for the different frame sizes.

Figure 2B:
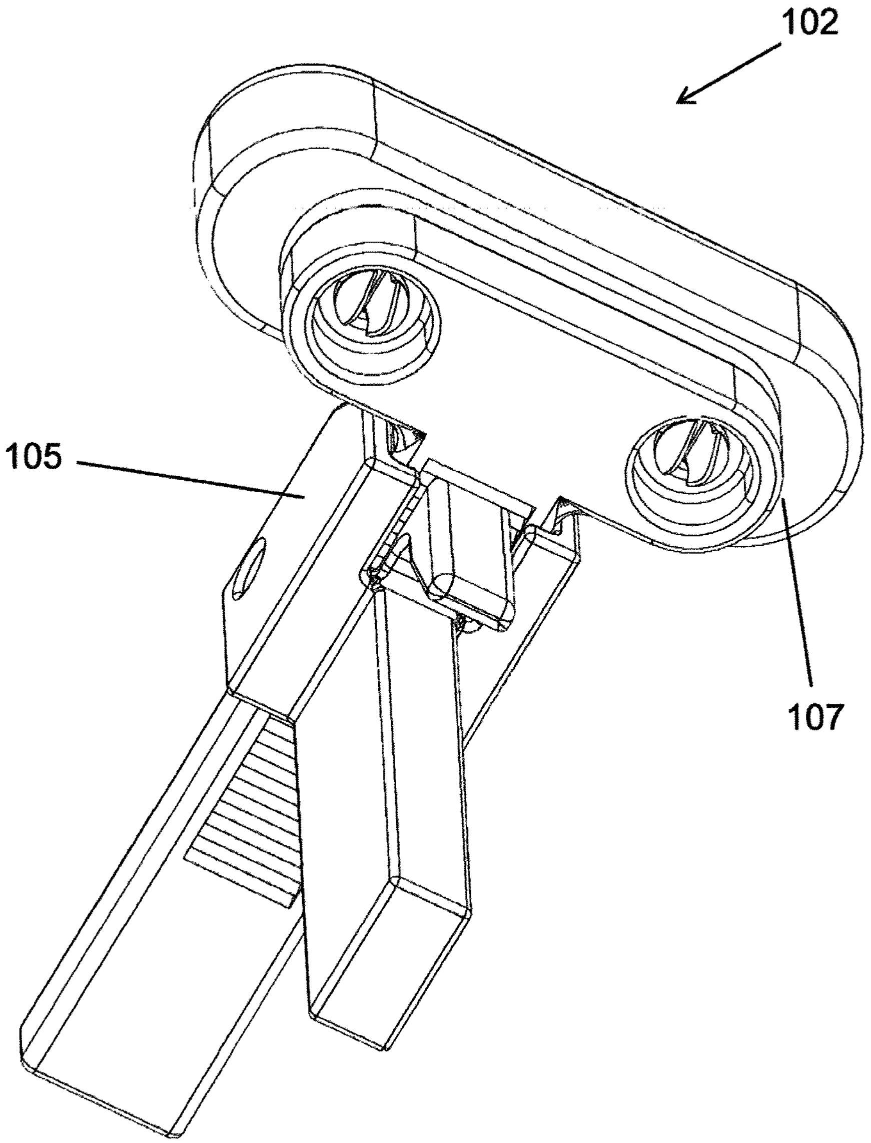
FIG. 2B illustrates a bottom perspective view of the forehead pad of FIG. 2A attached to an adjustable arm of the prone articulating headrest.

As further illustrated in FIG. 2B, once assembled, the forehead pad 102 can be configured to be snapped into an adjustable arm 105 via a support base 107. The support base 107 can be configured to attach to the base 201 of the forehead pad 102 via the snaps 202*a* and 202*b* (all shown in FIG. 2A), for example. For example, the base 201 may be formed with openings that are complementary in size and shape to the snaps 202*a* and 202*b* and allow a snap-fit assembly of the base 201 to the plurality of support pads, such as the forehead pad 102. However, implementations are not limited thereto and other implementations, such as using screws, bolts, tabs, etc., as such may be known to those skilled in the art, might be utilized to secure the base 201 to the forehead pad 102. The same adjustable arms 105 may be used with frames of different sizes.

Each of the pads 102, 103, 104*a*, and 104*b* may be independently adjustable to support and provide suitable padding of the patient's forehead, each zygomatic arch and chin while the patient is in the prone position, during which the patient lies face-down. Specifically, each of the pads 102, 103, 104*a*, and 104*b* can be adjusted vertically, meaning upwards and downwards, relative to the frame 101. Each of the pads can move horizontally inwardly and outwardly relative to the top and side portions of the frame 101, as further described below. In addition, each of the zygomatic arch pads 104*a* and 104*b* may be configured to rotate, as further described below. Each of the subtle movements and adjustments of the pads 102, 103, 104*a*, and 104*b* is intended to properly and safely pad the patient's face. To provide further support of the patient's head, each of the pads 102, 103, 104*a*, and 104*b* can be configured to expand and contract.

Figure 1B:
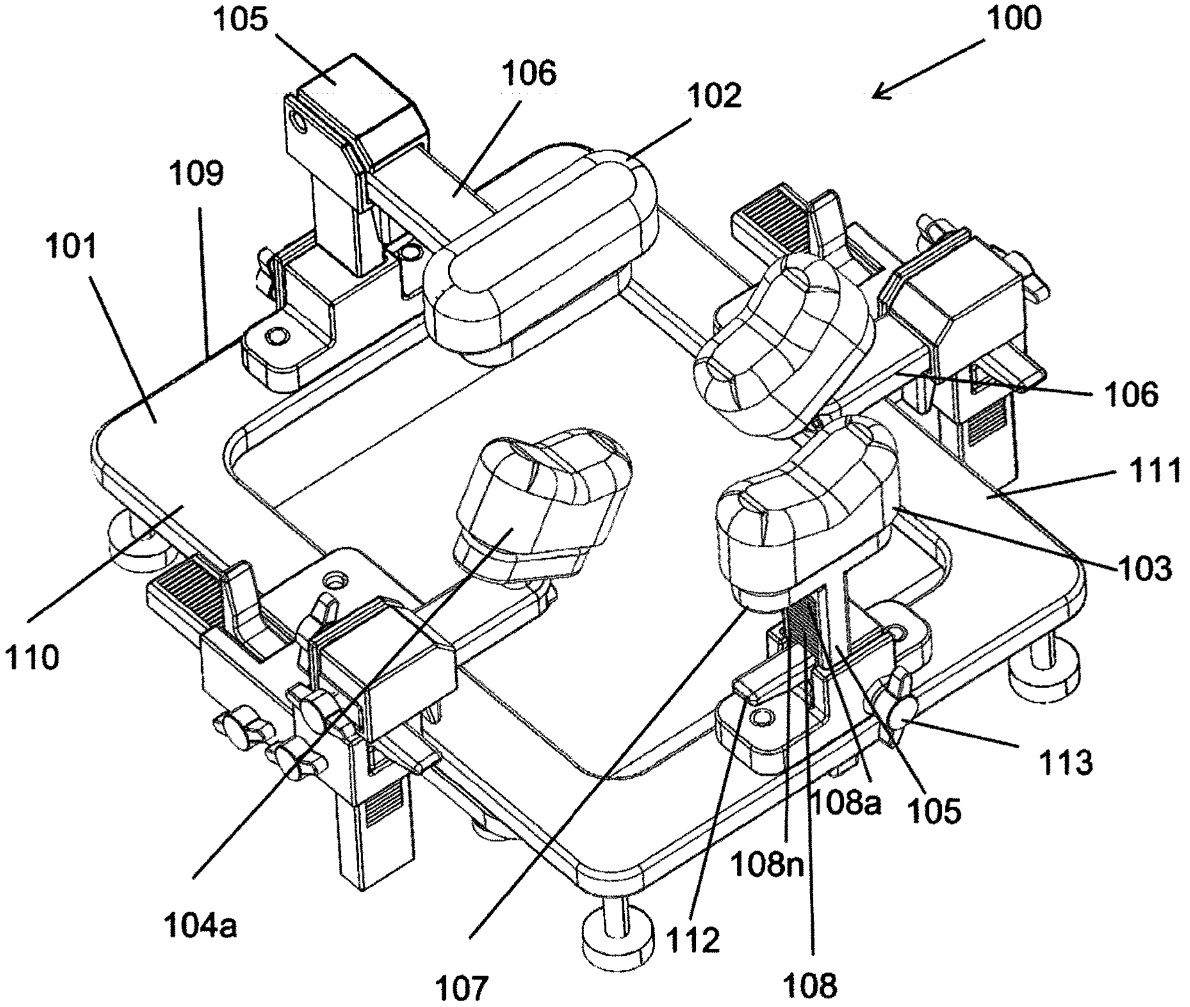
FIG. 1B is a component diagram illustrating an exemplary implementation of a prone articulating headrest assembly with pads in an extended position.

With reference to FIG. 1B, each of the pads 102, 103, 104*a*, and 104*b* can be removably attached to an adjustable arm 105 via an intermediary arm 106. Each adjustable arm 105 is operably connected to the frame 101. Each adjustable arm may have a first end 105*a* proximate the frame 101 and a second end 105*b* oppositely disposed from the first end 105*a*. The adjustable arms 105 can be configured to be fastened to the frame 101, via fasteners such as mounting screws (best illustrated in FIG. 6A) or other suitable fastening means, which may protrude from the bottom of the frame 101 toward the adjustable arms 105. Each intermediary arm 106 has a first end 106*a* proximate the second end of the adjustable arm 105. Each intermediary arm 106 further comprises a second end 106*b* oppositely disposed from the first end 106*a* and proximate the support pads 102, 104*a*, and 104*b*. In addition, at least one of the adjustable arms 105, such as the forehead pad 102 and/or the chin pad 103, for example, may be configured to protrude in the downward direction through the frame 101 from the top surface to the bottom surface of the frame 101 for additional stability and support of the patient's head during the medical or surgical procedure while the patient's head is engaged with the headrest 100.

As illustrated in FIG. 1B, the chin pad 103 can include a support base 107 and a first vertical adjuster 108 configured to move upwardly and downwardly relative to the frame 101. The first vertical adjuster 108 can be configured to adjust the chin pad 103 up and down relative to the top surface of the frame 101 of the headrest 100, depending on the position of the patient's chin and forehead relative to the frame 101, to accommodate the dimensions of the patient's nose and other facial features, for example. This vertical adjustment can be performed by downwardly pushing a lever 112 that engages with a plurality of teeth 108*a*-108*n* that may be formed horizontally on an external surface of the first vertical adjuster 108. The plurality of teeth 108*a*-108*n* may be configured as a rack of teeth. The lever 112 may be configured to function as a pawl. When a tip of the lever is disposed in a groove between two adjacent teeth, the front tooth prevents the vertical adjuster 108 from moving. Depression of the lever 112 moves the tip of the lever 112 out of the groove to release the chin pad 103 so that it may freely and selectably slide vertically upward or downward relative to the top surface of the frame 101. Once the lever 112 is released at a desired position, the tip of the lever 112 is again disposed between two teeth to secure the chin pad 103 at the desired position. It is intended to be within the scope of the disclosure that implementations are not limited to this type of engaging mechanism and other implementations are possible, as they might be known to those skilled in the art. For example, in certain implementations, a push button may be provided instead of the lever 112. A clamp lock 113 can be further provided on the external side of the adjustable arm 105, for example. Rotation of the clamp lock 113 can secure the intermediary arm 106 to the adjustable arm 105 at the desired height of the intermediary arm 106 after each vertical linear adjustment between the lever 112 and the teeth 108*a*-108*n*.

Figure 4A:
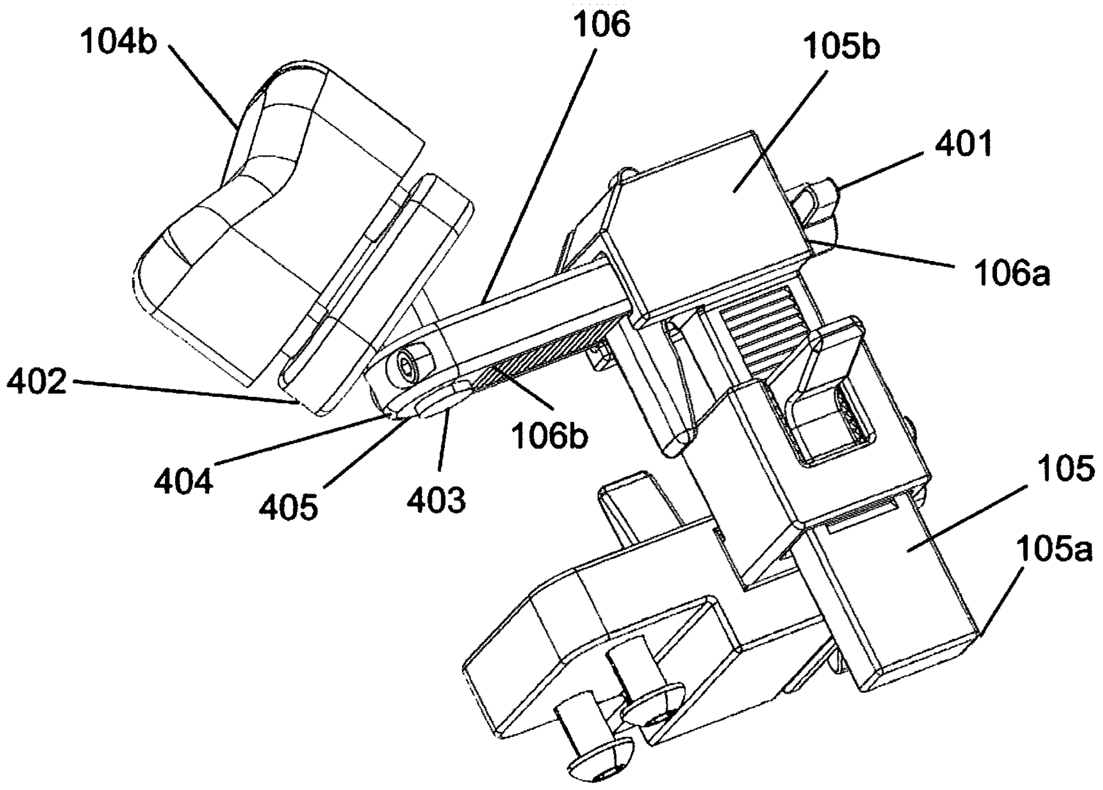
FIG. 4A illustrates a side perspective view of an exemplary implementation of a zygomatic arch pad of the exemplary prone articulating headrest of FIG. 1A and FIG. 1B attached to an articulating adjustable arm.

A similar vertical adjustment construction can be provided for each of the forehead pad 102 and the zygomatic arch pads 104*a*, 104*b* (as shown in FIG. 1B, in FIG. 1B, and FIG. 4A, for example). In an example implementation, the chin pad 103 may adjust vertically but not horizontally. For the other support pads, such as the forehead pad 102 and the zygomatic arch pads 104*a*, 104*b*, the second end 105*b*, the pads 102, 104*a*, 104*b* are independently and selectably movable in both the vertical and horizontal directions.

In one example implementation, vertical adjustment of the forehead pad 102, the chin pad 103, and the zygomatic arch pads 104*a* and 104*b* can be made in 1/16" increments for better precision in positioning the forehead pad 102, the chin pad 103, and the zygomatic arch pads 104*a*, 104*b* relative to the patient's face. However, implementations are not limited to these particular increments and other implementations are possible, as might be known to those skilled in the art.

Figure 3A:
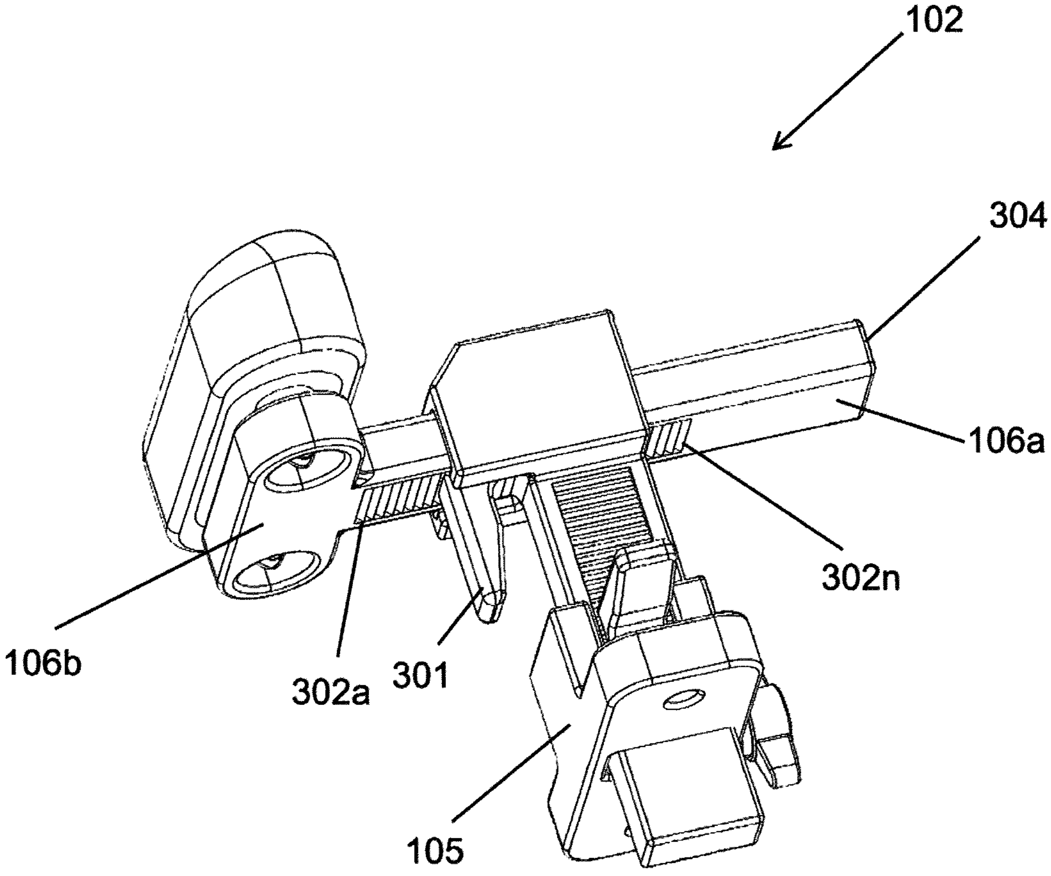
FIG. 3A illustrates a bottom perspective view of the forehead pad of FIG. 2B with additional details of the adjustable arm of the prone articulating headrest.

In addition, the forehead pad 102 can be adjusted horizontally relative to the vertical axis of the adjustable arm 105 (relative and perpendicular to the top surface of the frame 101). The forehead pad 102 may be configured to translate back and forth by way of the horizontal adjuster 304 (which functions in a similar manner as the vertical adjuster 108 illustrated in FIG. 1A). The horizontal adjuster 304 may comprise a bottom surface and may have a plurality of teeth disposed in succession on the bottom surface. For example, as illustrated in FIG. 3A, a lever 301 can engage with a plurality of teeth 302*a*-302*n* to release the forehead pad 102 to slide back and forth horizontally relative to the adjustable arm 105 and the top portion 109 of the frame 101 (as shown in FIG. 1B), and to secure the forehead pad 102 at the desired position. The plurality of teeth 302*a*-302*n* may be configured as a rack of teeth. The lever 301 may be configured to function as a pawl. When a tip of the lever 301 is disposed in a groove between two adjacent teeth, the front tooth prevents the horizontal adjuster 304 from moving. Depression of the lever 301 moves the tip of the lever 301 out of the groove to release the chin pad 103 so that it may freely and selectably slide horizontally inwards or outwards relative to the top surface of the frame 101. Once the lever 301 is released at a desired position, the tip of the lever 301 is again disposed between two teeth to secure the forehead pad 102 at the desired position. However, implementations are not limited to this type of engaging mechanism and other implementations are possible, as might be known to those skilled in the area.

Pressing the lever 301 toward the vertical portion of the adjustable arm 105 can disengage the lever 301 from the plurality of teeth 302*a*-302*n*, which allows the forehead pad 102 to move back and forth between an extended position and a retracted position. In the extended position, the forehead pad 102 extends inwardly from the top portion 109 of the frame 101 (as shown in FIG. 1B), and the distance between the forehead pad 102 and the chin pad 103 is reduced, which allows padded support for a smaller patient's head (as shown in FIG. 1B). In the retracted position, the forehead pad 102 rests substantially above the top portion 109 of the frame 101 (as shown in FIG. 1A), and the distance between the forehead pad 102 and the chin pad 103 is increased, which allows padded support for a larger patient's head. In one example implementation, the horizontal adjustments of the forehead pad 102 can be made in 1/16" increments for better precision in positioning the forehead pad 102 relative to the patient's forehead. However, implementations are not limited to these particular increments and other implementations are possible, as might be known to those skilled in the art. Once the desired position of the forehead pad 102 has been achieved, releasing the lever 301 outwardly from the vertical portion of the adjustable arm 105 engages the lever 301 with the in and out teeth 302*a*-302*n* and secures the forehead pad 102 in position.

Figure 3B:
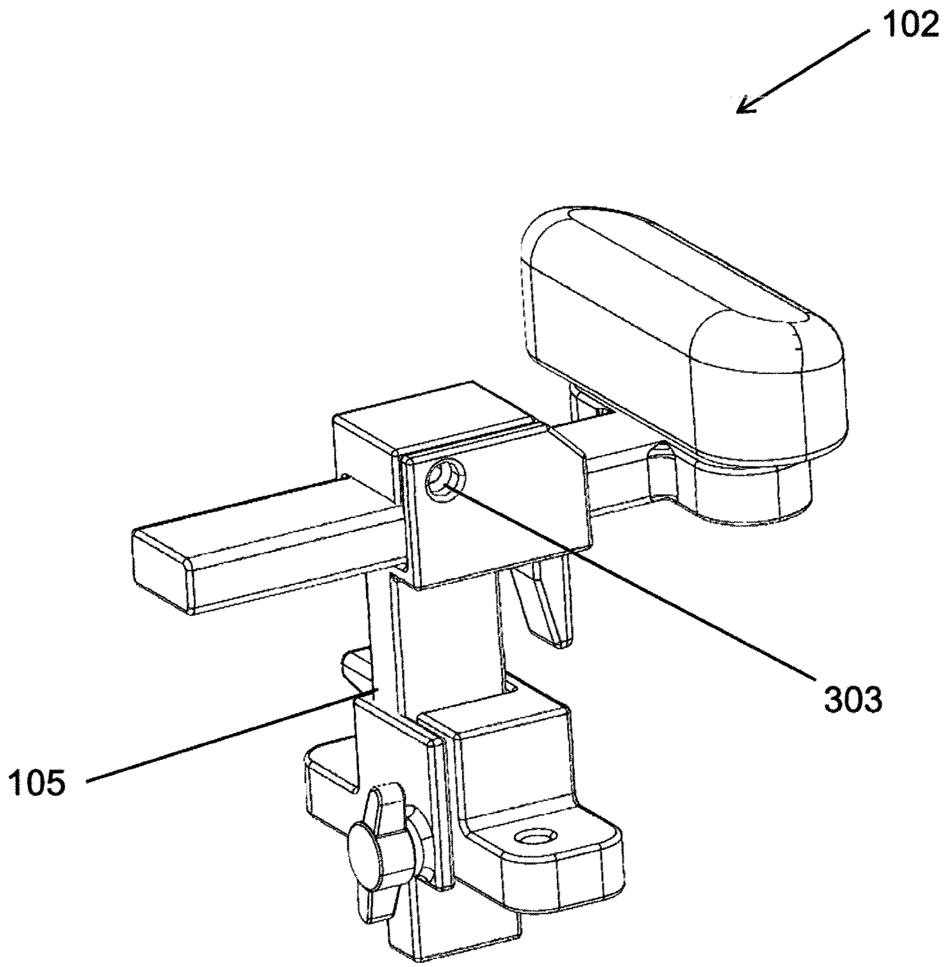
FIG. 3B illustrates a side perspective view of the forehead pad of FIG. 2B with details of exemplary locking features.

As shown in FIG. 3B, a clamp lock 303 can be provided on the external side of the adjustable arm 105, for example. Rotation of the clamp lock 303 can further secure the horizontal adjuster 304 to the adjustable arm 105 once the desired horizontal position of the forehead pad 102 has been achieved after each linear adjustment between the lever 301 and the plurality of teeth 302*a*-302*n*.

Similarly, each of the zygomatic arch pads 104*a* and 104*b* can be adjusted to move horizontally relative to the left and right side portions 110 and 111, respectively, of the frame 101 (illustrated in FIG. 1B). In an extended position, each of the zygomatic arch pads 104*a* and 104*b* extends inwardly from the left and right side portions 110 and 111 of the frame 101, respectively, toward each other (as shown in FIG. 1B for the zygomatic arch pad 104*a*, for example). These adjustments allow each of the zygomatic arch pads 104*a* and 104*b* to support a narrower patient's face. In a retracted position, each of the zygomatic arch pads 104*a* and 104*b* rests substantially above the left and right side portions 110 and 111, respectively, of the frame 101 (as shown in FIG. 1A for the zygomatic arch pad 104*a*). This position allows each of the zygomatic arch pads 104*a* and 104*b* to support a wider face. In one example implementation, the horizontal adjustments of the zygomatic arch pads 104*a* and 104*b* can be made with a 1" range of motion for each in and out movement. However, implementations are not limited to these particular increments and other implementations are possible, as might be known to those skilled in the area.

In addition, as illustrated in FIG. 4A, each of the zygomatic arch pads 104*a*, 104*b* may be configured to angularly rotate about its attachment point proximate the second end 106*b* of the intermediary arm 106. In another implementation, the zygomatic arch pads 104*a*, 104*b* may be rotated left and right relative to the horizontal (X) axis of the intermediary arm 106.

Figure 4B:
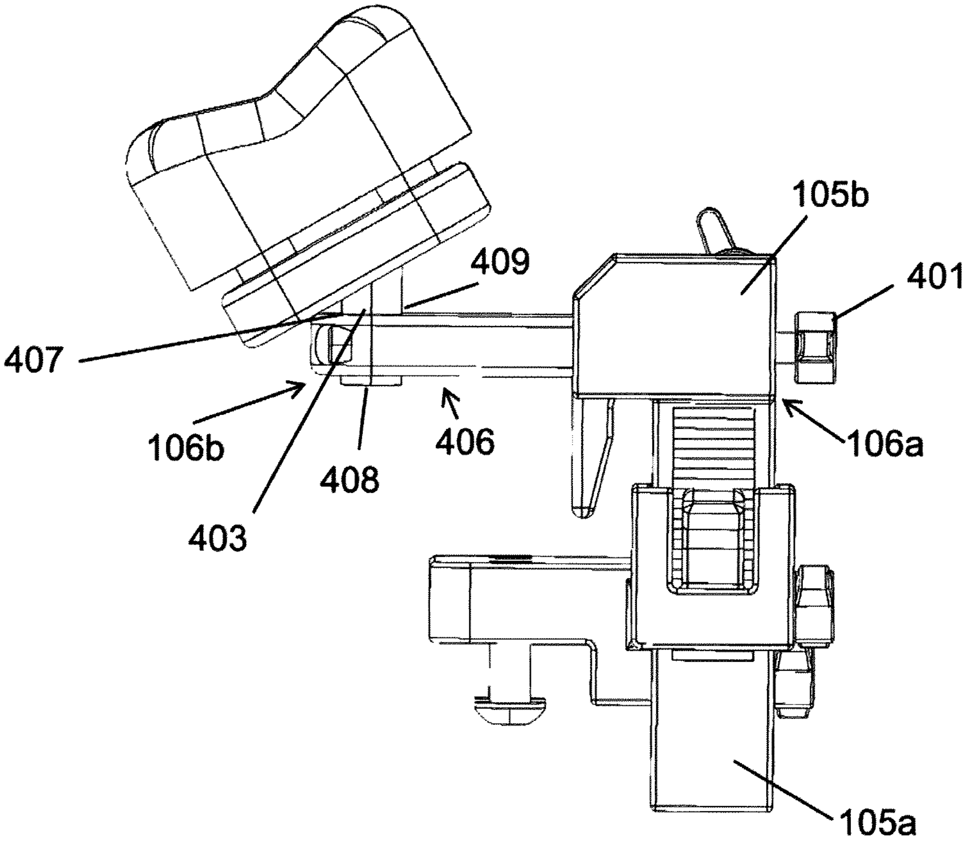
FIG. 4B illustrates a schematic side view of the zygomatic arch pad of FIG. 4A.
Figure 4C:
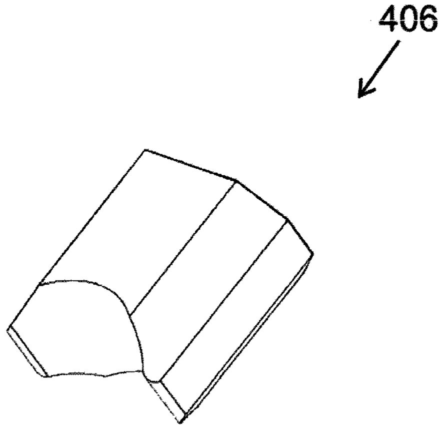
FIG. 4C illustrates a perspective view of a component of the prone articulating headrest assembly.

Similar to the forehead pad 102 (and the chin pad 103) described above, the zygomatic arch pad 104*b* can include a plastic base with snaps (best illustrated in FIG. 2A) and a support base 402 (illustrated in FIG. 4A) that may be configured to be snapped into the snaps of the plastic base. The support base 402 of the zygomatic arch pad 104*b* further includes a stepped shaft 403. The stepped shaft 403 can have multiple cylindrical portions with different diameters, and can taper in one or more steps, rather than with one continuous narrowing. For example, as illustrated in FIG. 4B, the stepped shaft 403 can include two wider (i.e., with a larger diameter) portions 407 and 408, and one narrower (i.e., with a smaller diameter) portion 409 arranged between the two wider portions 407 and 408. The narrower portion 409 may be configured to be inserted within a complementary opening formed in the intermediary arm 106. The complementary opening is formed orthogonally relative to the horizontal (X) axis the intermediary arm 106. The two wider portions 407 and 408 of the stepped shaft 403 are configured to be installed on both sides (above and underneath, respectively) of the narrower portion 409 and the opening of the intermediary arm 106.

Like the forehead pad 102 (and the chin pad 103) described above, the zygomatic arch pad 104*b* illustrated in FIG. 4A and FIG. 4B may be configured to be attached to an adjustable arm 105 via the intermediary arm 106. However, unlike the forehead pad 102 and the chin pad 103, the intermediary arm 106 attached to the zygomatic arch pad 104*b* in FIG. 4A may include an end block 404 with an opening 405 configured to accommodate the stepped shaft 403 of the support base 402 of the zygomatic arch pad 104*b*.

As further illustrated in FIG. 4A and FIG. 4B, a rotation lock screw 401 can be provided on the adjustable arm 105 for left and right rotation of the zygomatic arch pad 104*b* relative to the horizontal (X) axis of the intermediary arm 106. The head of the rotation lock screw 401 can be provided on the external side of the adjustable arm 105 opposite the end block 404 of the zygomatic arch pad 104*b*, for example. In the adjusted position of the zygomatic arch pad 104*b*, the end of the screw thread or the cylindrical body of the rotation lock screw 401 (opposite the head of the rotation lock screw 401) may be configured to about a lock block 406 (numbered in FIG. 4B). The lock block 406 is arranged between the narrower portion 409 of the stepped shaft 403 and the end of the screw thread or the cylindrical body of the rotation lock screw 401. Rotation of the rotation lock screw 401 in the counterclockwise direction, for example, can loosen the engagement between the lock block 406 and the rotation lock screw 401, and the zygomatic arch pad 104*b* can be manually rotated in the left or right direction relative to the horizontal (X) axis of the intermediary arm 106. After the desired position for the zygomatic arch pad 104*b* is reached, the rotation lock screw 401 can be re-tightened by rotating the rotation lock screw 401 in the clockwise direction, for example, until the end of the screw thread or the cylindrical body of the rotation lock screw 401 engages with the lock block 406, thereby securing the adjusted position of the zygomatic arch pad 104*b*.

However, implementations are not limited thereto, and other implementations are possible, as might be known to those skilled in the area. For example, the stepped shaft 403 and the support base 402 the zygomatic arch pad 104*b* can be configured to form a joint that can allow different degrees and types of movement of the support base 402 and the zygomatic arch pad 104*b* attached to the support base 402 relative to the intermediary arm 106.

Figure 5:
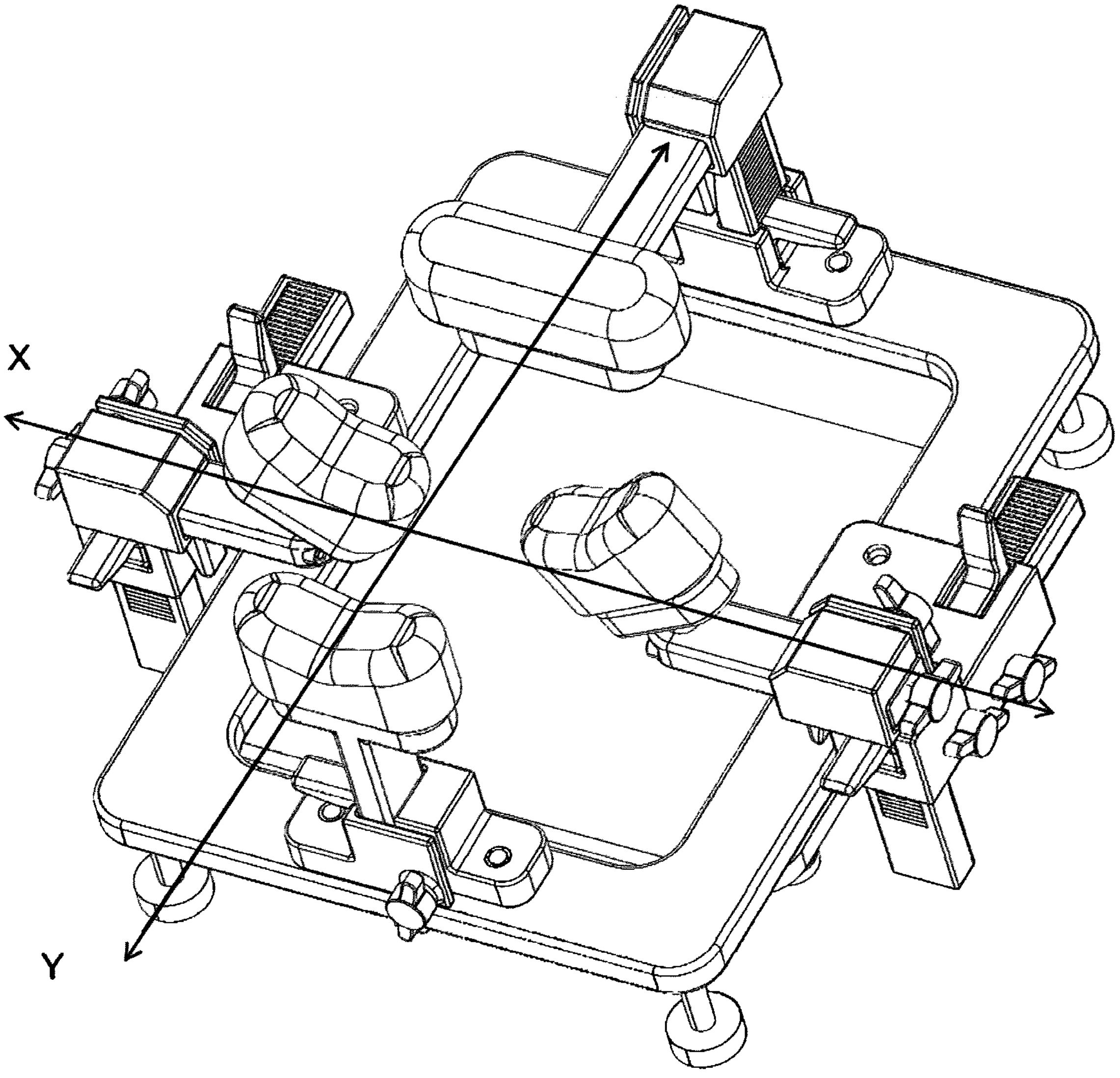
FIG. 5 illustrates schematically the adjustment ranges of the pads of the exemplary prone articulating headrest assembly of FIG. 1A and FIG. 1B.

The articulating support base 402 and the zygomatic arch pad 104*b* can be configured to allow rotating adjustment of the support base 402 (and zygomatic arch pad 104*b* assembled to it) left and right relative to the X-axis of the intermediary arm 106 with a 1" range of motion for each left and right movement, as illustrated in FIG. 5, for example. However, implementations are not limited to this particular range and other implementations are possible, as might be known to those skilled in the area. These rotating movements allow adjustments of the position of the zygomatic arch pads 104*a* and 104*b* for different patients' heads or face shapes and can minimize undue pressure especially on the eyes and cheeks of the patients.

Any adjustment increment may be utilized with the adjustment arms 105 and the intermediary arms 106. For example, each of the plurality of pads 102, 103, 104*a*, and 104*b* may have a 1½" range of motion in the vertical direction relative to the top surface of the frame 101, as illustrated in FIG. 5, for example. In another implementation, each of the zygomatic arch pads 104*a*, 104*b* may have a 1" range of motion in the horizontal direction relative coincident to the X-axis, as illustrated in FIG. for example. Each of the zygomatic arch pads 104*a* and 104*b* have a 1" range of motion relative to the Y-axis, as illustrated in FIG. 5, for example. The forehead pad 102 may have a 2" range of motion horizontally relative to the Y-axis, as illustrated in FIG. 5, for example. It should be understood that the terms horizontal and vertical are relative to the frame member 101. As such, if the frame member 101 is slightly angled relative to an underlying surface, the adjustable arms 105 may still move in an upward and downward direction, i.e., vertically, relative to the support frame 101. Additionally, the intermediary arms 106 may move horizontally relative to the support frame, i.e., translating in an outwardly extended position or an inwardly contracted position.

Figure 6A:
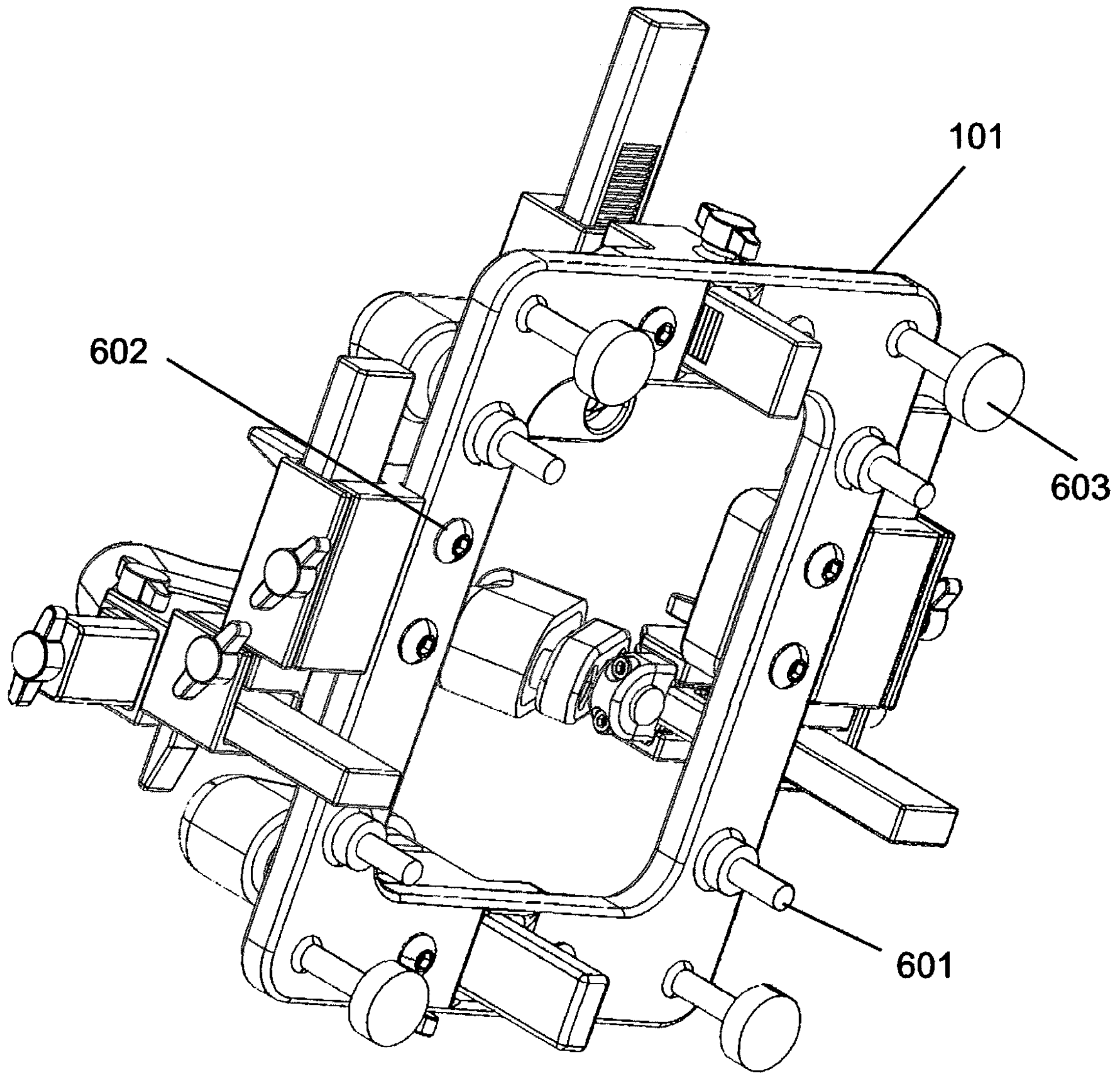
FIG. 6A is a bottom perspective view of the exemplary implementation of the exemplary prone articulating headrest assembly of FIG. 1A and FIG. 1B without a mirror.

FIG. 6A is a bottom view of an exemplary implementation of the prone articulating headrest assembly 100. Four threaded posts 601 are provided on the frame 101 for attachment of a mirror (the mirror is not shown in FIG. 6A, but is further illustrated in FIG. 6B). Mounting screws 602 (or other suitable fastening means) extend from the bottom of the frame 101 toward the adjustable arms 105 to secure the adjustable arms 105 to the frame 101. Four legs 603 are configured to removably attach to the frame 101. The legs 503 secure the prone articulating headrest assembly 100 on the surface of a surgical bed, for example.

Figure 6B:
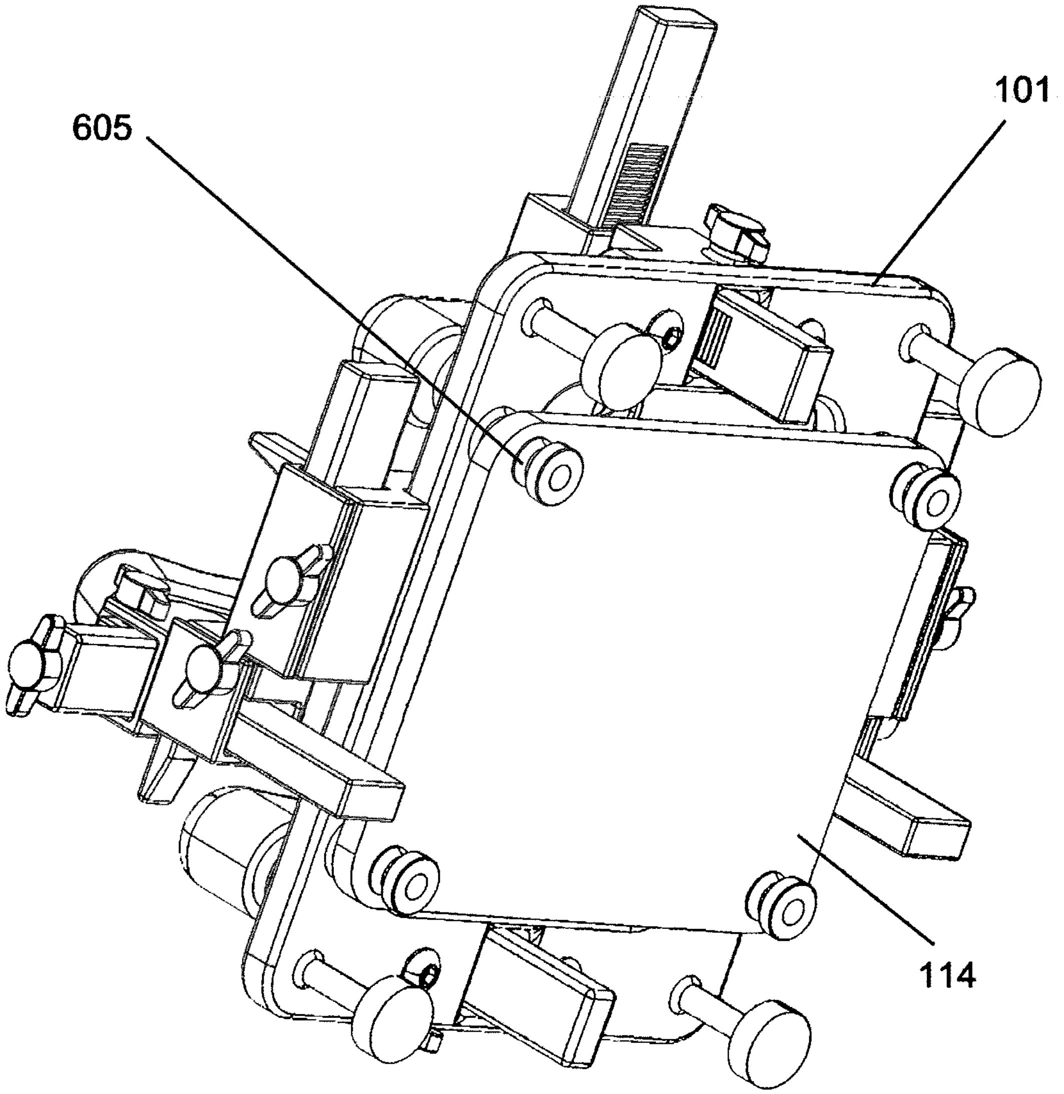
FIG. 6B is a bottom perspective view of the exemplary implementation of the exemplary prone articulating headrest assembly of FIG. 1A and FIG. 1B with a mirror attached to the frame.
Figure 7:
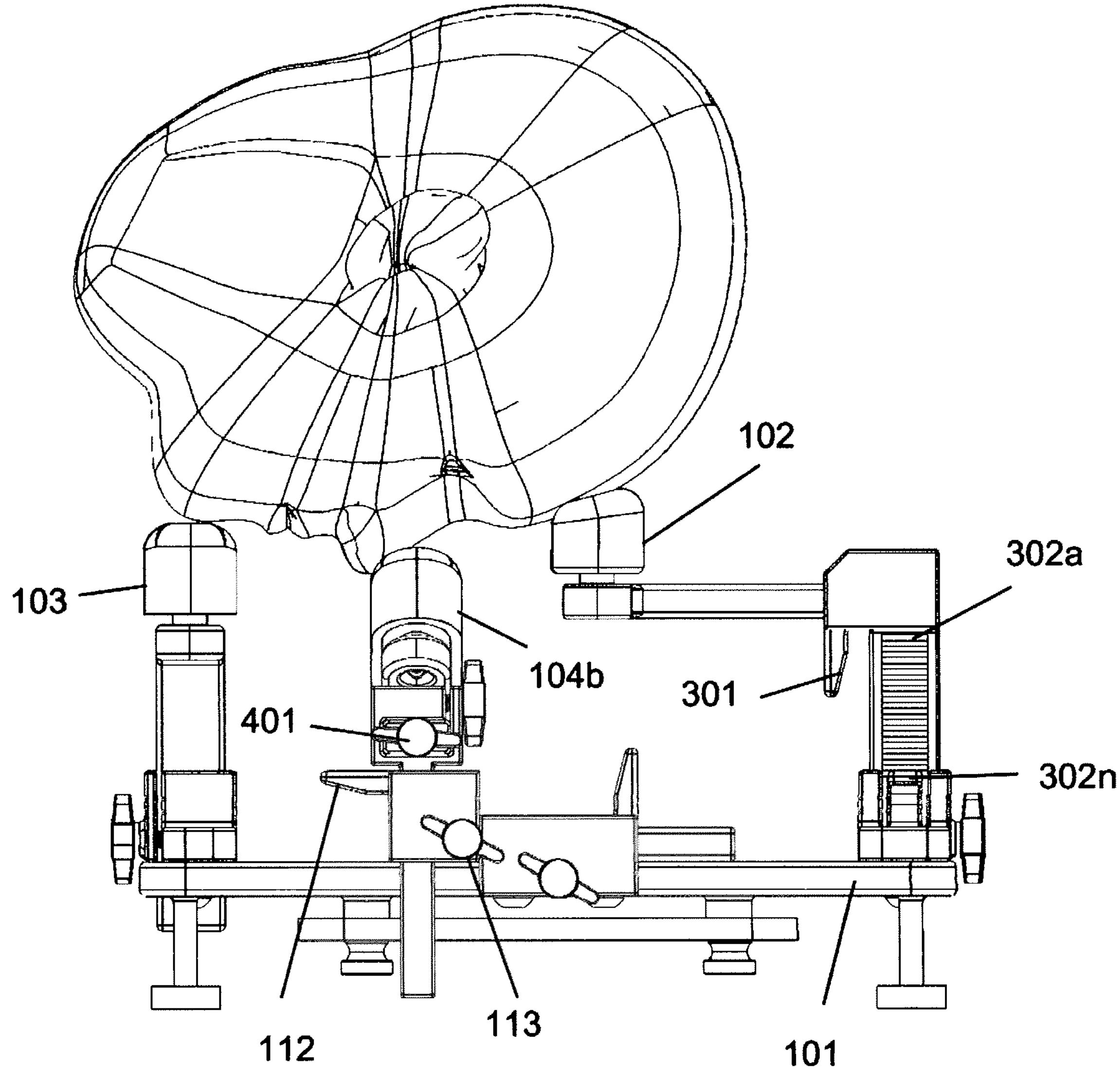
FIG. 7 is a side view of a patient in the prone position utilizing the prone articulating headrest assembly.

FIG. 6B is a bottom view of an exemplary implementation of the prone articulating headrest assembly 100 with a plate mirror 114 attached to the frame 101. The plate mirror 114 enables constant visualization of the patient's face during the surgical procedure. Thumb screws 605 extend from the bottom of the mirror 114 toward the frame 101 to secure the mirror 114 to the frame 101.

As further illustrated in FIG. 1A, a plate mirror 114 is provided below the frame 101 and the pads 102, 103, 104*a*, and 104*b*. The plate mirror 114 can be configured to enable constant visualization of the patient's face during the surgical procedure. The plate mirror 114 may be removable. The mirror 114 may be installed in position below the frame 101 before the patient is positioned on the headrest 100. Both the mirror 114 and the frame 101 may be provided in different sizes, which would make them interchangeable, depending on the size of the patient's head and the size of the selected frame, for example.

The dimensions of the mirror 114 and the frame 101 may be provided in such a way that there can be sufficient access space between the mirror 114 and the frame 101, to allow for medical instruments, tubes or other medical devices that might be attached to the patient's head to freely protrude underneath the headrest 100, without interfering with airway supply tubing or monitoring equipment that may be attached to patient's nose or mouth, the patient's face, portions of the headrest 100, or other medical equipment arranged nearby.

A method of adjusting the headrest assembly 100 may include the steps of selecting a frame 101 depending on a size of the patient's head, selecting a mirror 114 depending on the size of the patient's head, attaching the mirror 114 to the bottom surface of the frame 101, mounting four legs 603 to the bottom surface of the frame 101, and attaching a forehead pad 102, a chin pad 103, and two zygomatic arch pads 104*a* and 104*b* to the top surface of the frame 101. The top surface of the frame is opposite to the bottom surface of the frame.

The method may further include the step of vertically adjusting at least one of the forehead pad 102, the chin pad 103, or the two zygomatic arch pads 104*a* and 104*b* relative to the top surface of the frame 101. The method may further include the step of horizontally adjusting at least one of the forehead pad 102 or the two zygomatic arch pads 104*a* and 104*b* relative to a top portion 109 of the frame 101 or to the side portions 110 and 111 of the frame 101, respectively. The method may further include the step of rotating at least one of the two zygomatic arch pads 104*a* and 104*b* at an angle horizontally and vertically relative to an X-axis and a Y-axis. The X-axis may be perpendicular to the top portion 109 and a bottom portion of the frame 101, and the Y-axis may be perpendicular to the side portions 110 and 111 of the frame 101.

Figure 8:
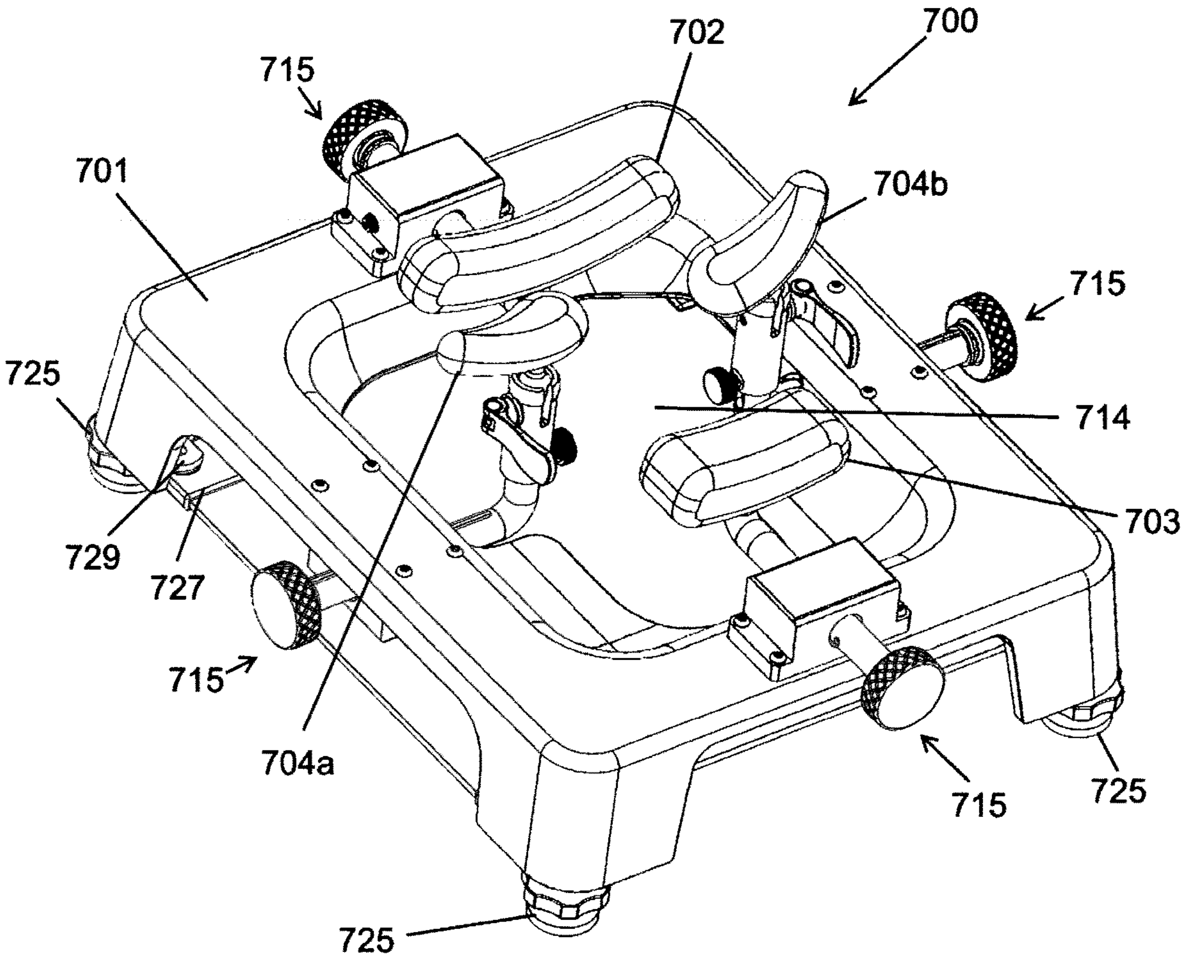
FIG. 8 is a top perspective view of another embodiment of a prone articulating headrest.
Figure 9:
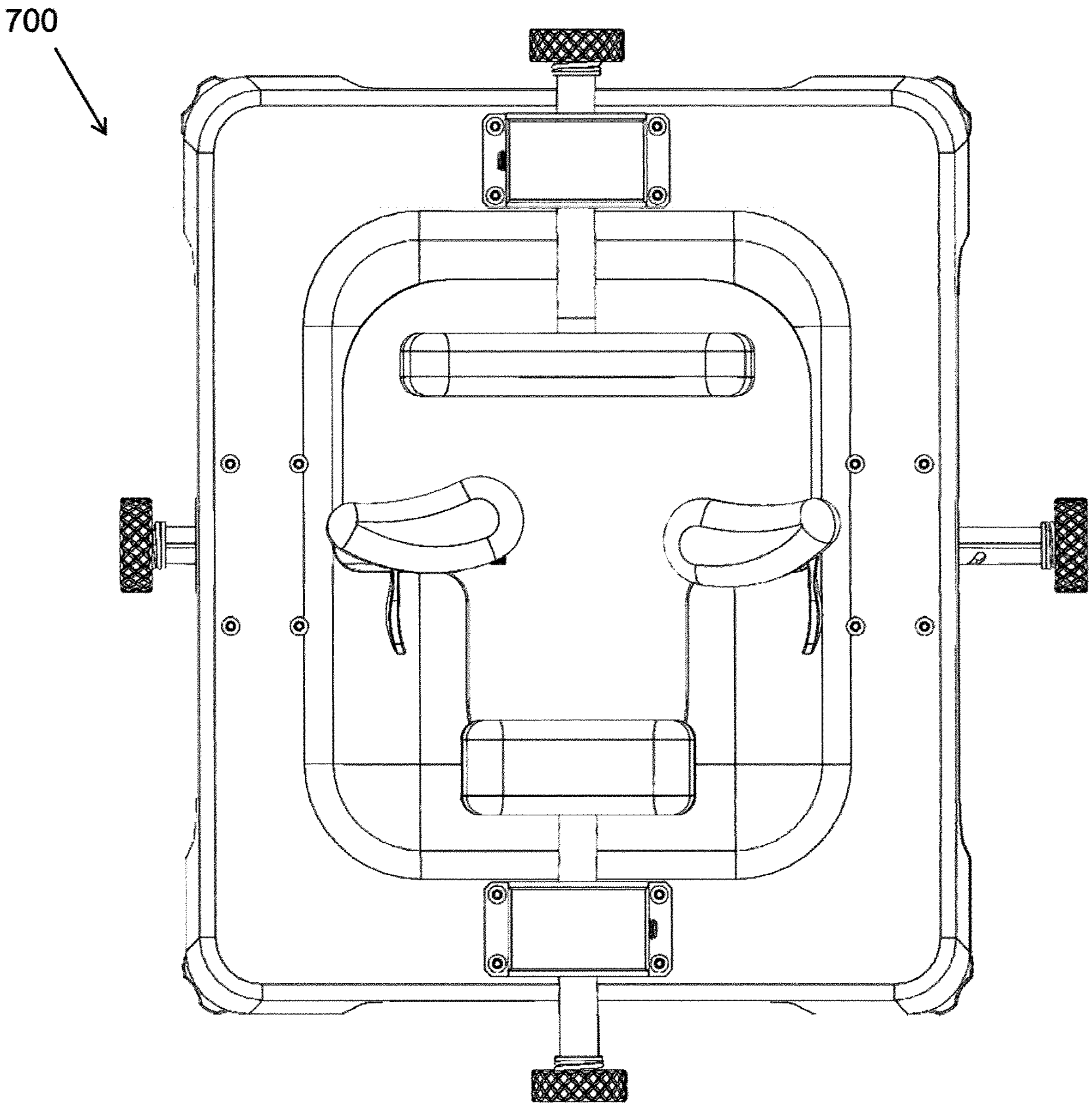
FIG. 9 is a top view of the headrest of FIG. 8.
Figure 10:
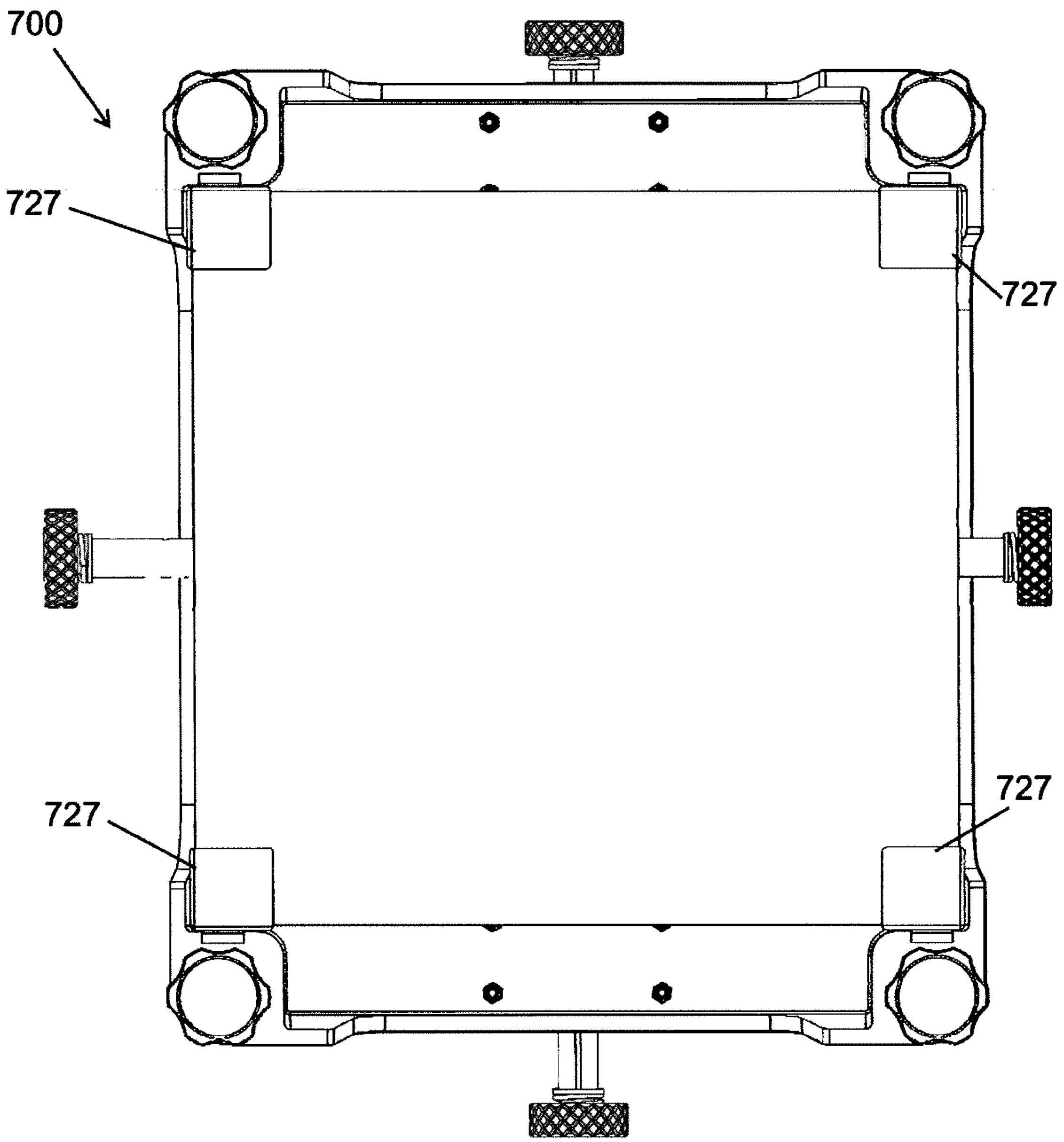
FIG. 10 is a bottom view of the headrest of FIG. 8.
Figure 11:
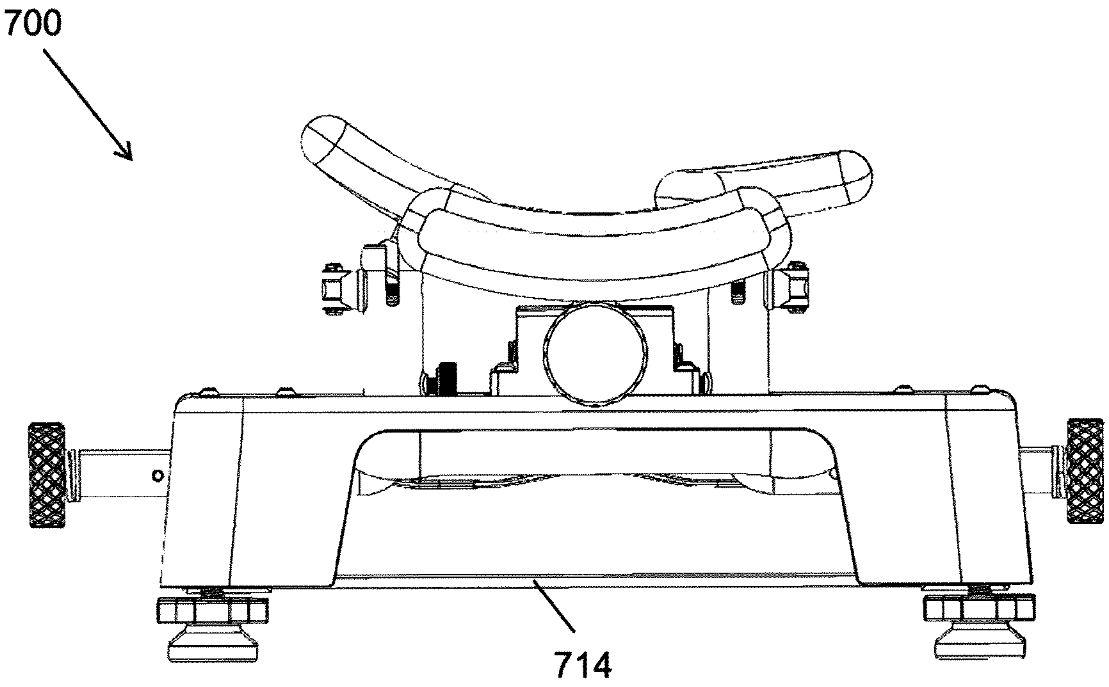
FIG. 11 is an upper side view of the headrest of FIG. 8.
Figure 12:
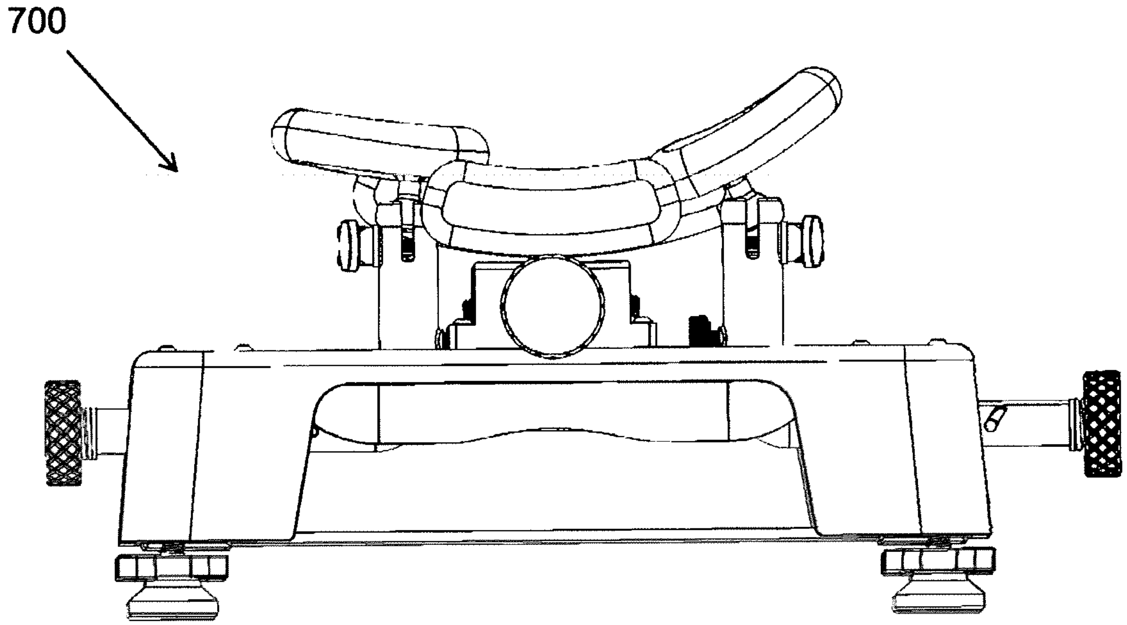
FIG. 12 is a lower side view of the headrest of FIG. 8.
Figure 13:
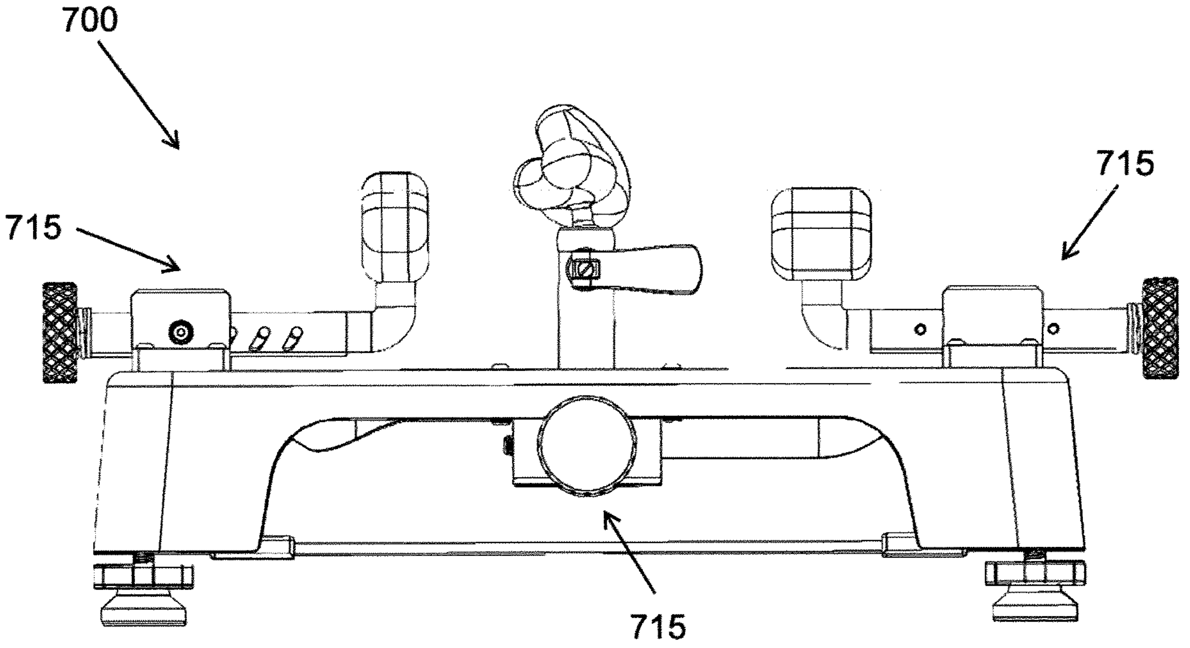
FIG. 13 is a left side view of the headrest of FIG. 8.
Figure 14:
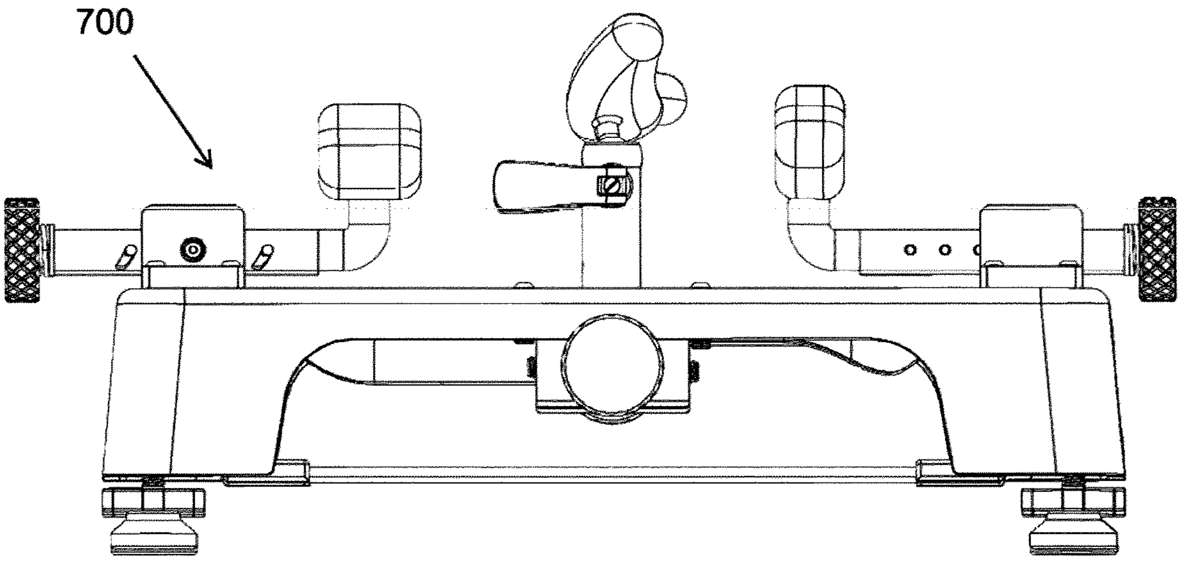
FIG. 14 is a right side view of the headrest of FIG. 8.
Figure 15:
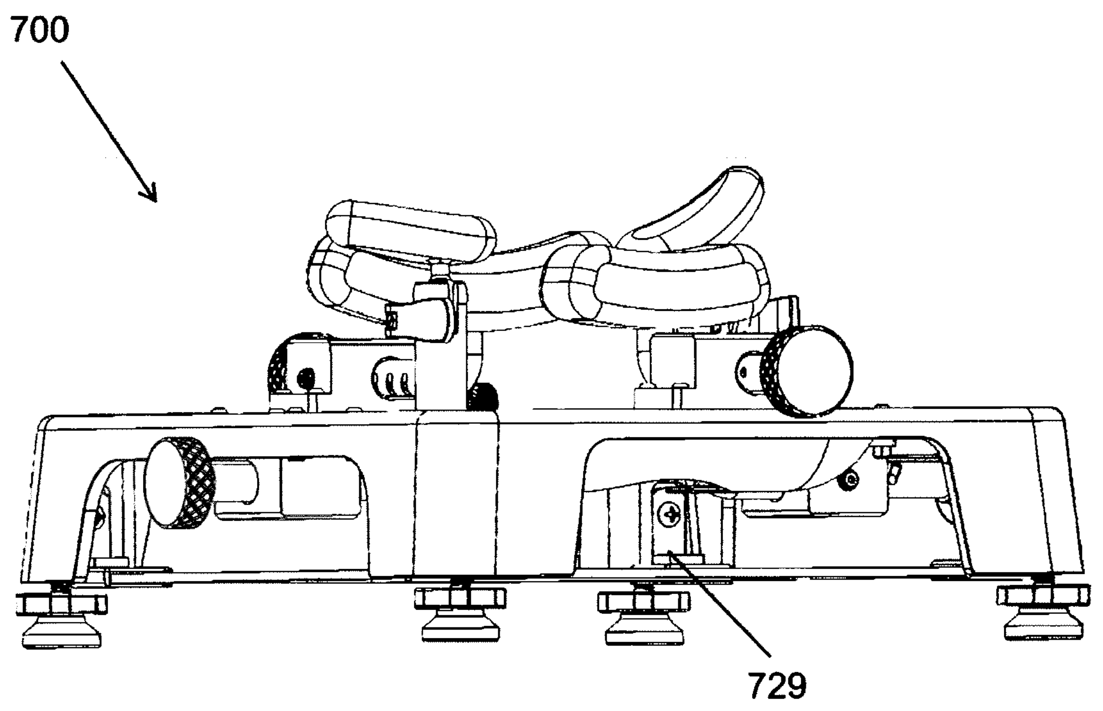
FIG. 15 is a corner view of the headrest of FIG. 8.
Figure 16:
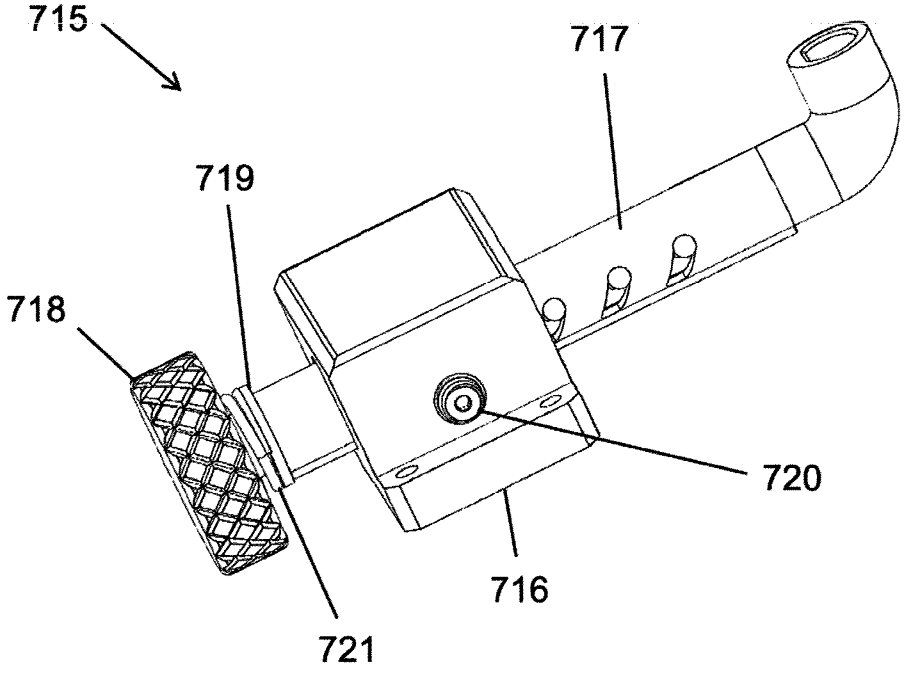
FIG. 16 is a perspective view of a slide lock assembly of the headrest of FIG. 8.
Figure 17:
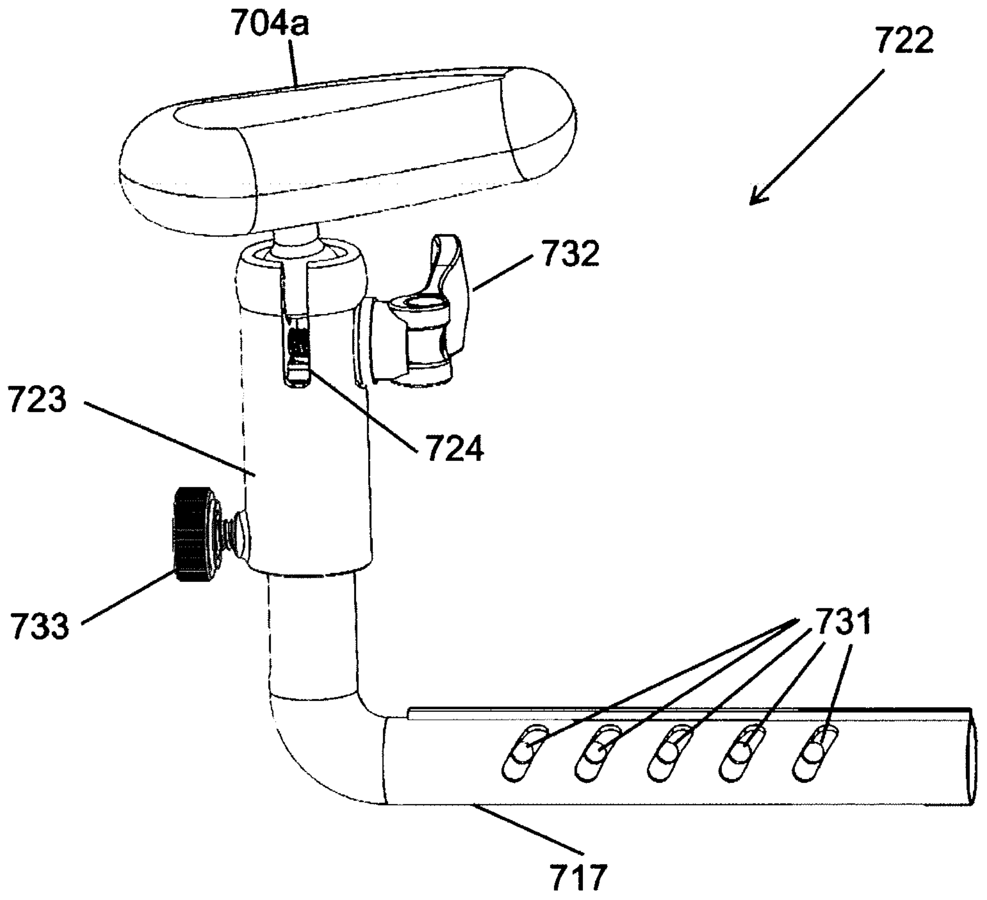
FIG. 17 is a side view of a zygomatic pad assembly of the headrest of FIG. 8.
Figure 18:
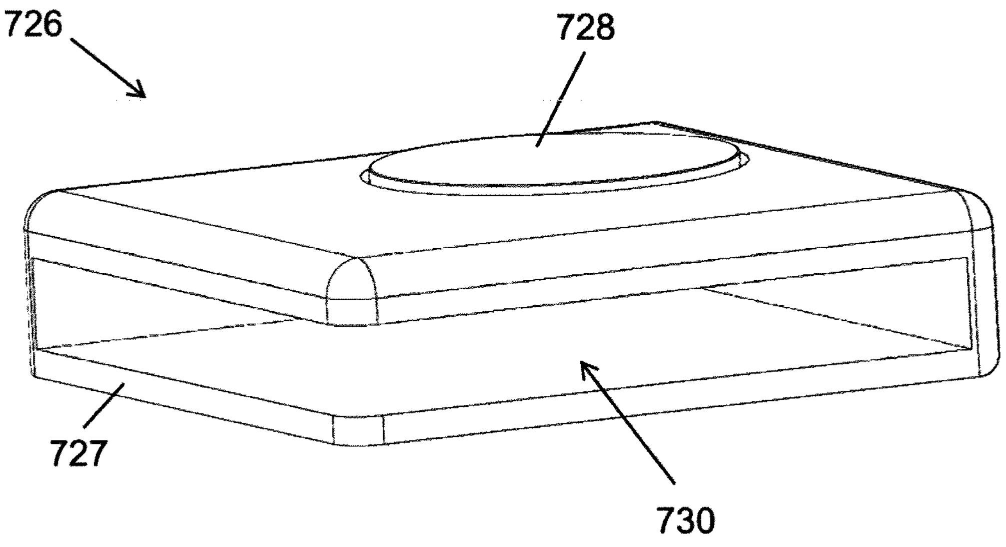
FIG. 18 is a perspective view of a corner magnet assembly of the headrest of FIG. 8.

FIGS. 8-18 illustrate aspects of another example of a headrest 700 in accordance with some embodiments of the present disclosure. FIG. 8 is a top perspective view, FIG. 9 is a top view, FIG. 10 is a bottom view, FIG. 11 is an upper side view, FIG. 12 is a lower side view, FIG. 13 is a left side view, FIG. 14 is a right side view, FIG. 15 is a corner view, FIG. 16 is a perspective view of a slide lock assembly, FIG. 17 is a side view of a zygomatic pad assembly, and FIG. 18 is a perspective view of a corner magnet assembly.

The headrest 700 includes a frame 701 having four legs, each leg being supported by a leveling mount 725. The leveling mounts may be high-capacity swivel leveling mounts. Each mount may be independently adjustable to achieve a desired height for each corner of the frame 701. The frame may be made of plastic, metal, or a composite.

A plurality of support pads 702, 703, 704*a*, 704*b* are operably connected to the frame 701 and configured to contact portions of a patient's face. The support pads include forehead pad 702, chin pad 703, left zygomatic pad 704*a*, and right zygomatic pad 704*b*. Each support pad is associated with a separate slide lock assembly 715 to permit independent movement of each support pad toward or away from a space above an opening in the frame. Each slide lock assembly 715 includes a slide housing 716 (e.g., a linear slide housing), a slide lock outer sleeve 717, a screw set 731 (e.g., an extra-long extended-tip set screw) within the outer sleeve 717, a plunger 720 (e.g., a slotted long nose steel spring plunger), a slide lock actuator 718, a compression spring 721, and a spring catch 719. Although in the depicted embodiment the slide housings associated with the forehead pad 702 and the chin pad 703 are secured to the top of the frame 701 and the slide housings associated with the zygomatic pads 704*a*, 704*b* are secured to an underside of the frame, other configurations are also contemplated and form part of this disclosure. For example, the slide housings associated with the forehead pad 702 and/or the chin pad 703 may be secured to the underside of the frame 701, the slide housings associated with the zygomatic pads 704*a*, 704*b* may be secured to the top of the frame 701, all slide housings 716 may be secured to the top of the frame 701, or all slide housings 716 may be secured to the underside of the frame. 701.

Although not depicted, is also contemplated that one or more rails may be secured to the frame 701 and at least one of the slide housings may be slidably attached to the rail. This would permit left/right movement of the forehead pad 702 and/or the chin pad 703 and/or up/down movement of one or both zygomatic pads 704*a*, 704*b*.

Also included in the headrest 700 are two zygomatic pad assemblies 722. Each zygomatic pad assembly 722 is associated with a different slide lock assembly and includes a zygomatic pad 704*a* or 704*b*, an articulating mast 723, a screw 733 or other fastener, a clamping handle or other fastener 732 (e.g., a clamping handle with a threaded stud), and a spring. The zygomatic pad 704*a*, 704*b* may be unitary with or attached to a handle including a ball joint configured to be associated with a receptacle associated with the articulating post 723. The inclusion of the ball joint may permit freer movement of the pad during setup and/or during use with a patient. In some embodiments, the ball joint is locked prior to use with a patient or during use with a patient. In other embodiments, the ball joint is in an unlocked state during use with a patient. The articulating sleeve may be slidably adjustable in a vertical direction and also may be locked in a desired position.

Similar structures are optionally included to permit vertical movement of the forehead pad 702 and/or the chin pad 703.

The headrest 700 may further include a mirror 714 (e.g., a mirrored, scratch-resistant acrylic sheet). The mirror 714 may be mechanically secured to the frame 701 to facilitate quick removal. In some embodiments, corner brackets 729 are secured to the frame 701 (e.g., via screws) and each corner bracket is associated with a different corner magnet assembly 726. One non-limiting example of a suitable bracket material is steel, optionally plated with zinc.

Each corner magnet assembly includes a corner mount 727 including a recess 730 for receiving a corner of a mirror 714 and a magnet 728 to make the assembly 726 detachably securable to the corner bracket 729. In some embodiments, the magnet includes a rare earth metal. The rare earth magnet may be a samarium-cobalt magnet (e.g., $SmCo_5$, $SmCo_{17}$) or a neodymium magnet (e.g., $Nd_2Fe_{14}B$). In other embodiments, the magnet does not contain a rare earth metal. In some embodiments, the magnet is an alnico magnet, a ceramic magnet, or a ferrite magnet. It is also contemplated that two or more different types of magnets may be utilized in different corners of the headrest 700. However, in preferred embodiments, all four magnets are the same.

It should be understood that the headrest 700 or FIGS. 8-18 may be modified to include features illustrated in FIGS. 1-7 or otherwise described herein. Similarly, the headrest of FIGS. 1-7 may be modified to include features illustrated in FIGS. 8-18 or otherwise described herein.

The prone headrest assembly and the method of adjusting the prone headrest assembly described herein can be used to provide an easily adjustable and functional padded face guard with separate pads for the patient's forehead, chin, and each zygomatic arch. This independently adjustable configuration allows for the patient's eyes, ears, nose, and mouth to remain free of pressure during the procedures, thereby avoiding potential complications from improper padding of the patient's face and increasing patients' safety and well-being during surgical procedures. Because each pad independently adjustable, the above-described prone articulating headrest assembly may be suitable for a variety of patients with different physical attributes, which would allow repeated and continued use of the headrest for multiple patients.

The exemplary embodiments have been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The word "exemplary" is used herein to mean serving as an example, instance or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, at least one of A and B and/or the like generally means A or B or both A and B. In addition, the articles "a" and "an" as used in this application and the appended claims may generally be construed to mean "one or more" unless specified otherwise or clear from context to be directed to a singular form.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Of course, those skilled in the art will recognize many modifications may be made to this configuration without departing from the scope or spirit of the claimed subject matter.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure.

In addition, while a particular feature of the disclosure may have been disclosed with respect to only one of several implementations, such feature may be combined with one or more other features of the other implementations as may be desired and advantageous for any given or particular application. Furthermore, to the extent that the terms "includes," "having," "has," "with," or variants thereof are used in either the detailed description or the claims, such terms are intended to be inclusive in a manner similar to the term "comprising."

The implementations have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

The invention claimed is:

1. A headrest assembly comprising:

a frame;

a mirror releasably attached to the frame;

a plurality of magnets for attaching the mirror to the frame;

a forehead pad assembly operably connected to the frame, the forehead pad assembly comprising:

a forehead pad; and a forehead pad actuator configured to actuate movement of the forehead pad towards or away from the chin pad;

a chin pad assembly operably connected to the frame, the chin pad assembly comprising:

a chin pad; and a chin pad actuator configured to actuate movement of the chin pad towards or away from the forehead pad;

two zygomatic arch pads operably connected to the frame, each zygomatic arch pad comprising:

a zygomatic arch pad; and a zygomatic pad actuator configured to actuate movement of the zygomatic arch pad towards or away from the other zygomatic arch pad;

four corner magnet mounts, each corner magnet mount associated with a different individual magnet of the plurality of magnets and comprising a mirror corner recess configured to receive a different corner of the mirror; and four corner brackets, each corner bracket associated with a different cornet magnet mount.

2. The headrest assembly of claim 1, wherein the magnets comprise a rare earth metal.

3. The headrest assembly of claim 2, wherein the rare earth metal is neodymium.

4. The headrest assembly of claim 1, wherein the frame comprises four legs; and wherein each leg is connected to a different leveling mount.

5. A headrest assembly comprising:

a frame;

a forehead pad assembly operably connected to the frame, the forehead pad assembly comprising:

a forehead pad;

a forehead pad actuator configured to actuate movement of the forehead pad towards or away from the chin pad;

a chin pad assembly operably connected to the frame, the chin pad assembly comprising:

a chin pad; and a chin pad actuator configured to actuate movement of the chin pad towards or away from the forehead pad; and two zygomatic arch pads operably connected to the frame, each zygomatic arch pad comprising:

a zygomatic arch pad; and a zygomatic pad actuator configured to actuate movement of the zygomatic arch pad towards or away from the other zygomatic arch pad;

wherein the forehead pad assembly further comprises:

a forehead slide lock connecting the forehead pad to the forehead pad actuator;

wherein the chin pad assembly further comprises:

a chin slide lock connecting the chin pad to the chin pad actuator; and wherein each zygomatic arch pad further comprises:

a zygomatic slide lock extending between the zygomatic arch pad to the zygomatic pad actuator.

6. The headrest assembly of claim 5, wherein each zygomatic arch pad further comprises:

an articulating mast extending between the zygomatic slide lock and the zygomatic arch pad.

7. The headrest assembly of claim 6, wherein the articulating mast is connected to the zygomatic arch pad via a ball joint.

8. The headrest assembly of claim 7, further comprising:

a screw extending into the articulating mast to lock a vertical position of the zygomatic arch pad; and a clamping handle to lock the ball joint.

9. The headrest assembly of claim 5, wherein the forehead slide lock comprises a forehead slide housing attached to the frame via at least one fastener; wherein the chin slide lock comprises a chin slide housing attached to the frame via at least one fastener; and wherein each zygomatic slide lock comprises a zygomatic slide housing attached to the frame via at least one fastener.

10. The headrest assembly of claim 9, wherein the chin slide housing and the forehead slide housing are attached to a top surface of the frame; and wherein the zygomatic slide housing is attached to an underside of the frame.

* * * * *